(12) United States Patent
Ronnau

(10) Patent No.: US 10,659,934 B2
(45) Date of Patent: *May 19, 2020

(54) METHODS AND SYSTEMS FOR SOCIAL NETWORKING WITH AUTONOMOUS MOBILE AGENTS

(71) Applicant: Autonomous Agent Technologies, LLC, Cheyenne, WY (US)

(72) Inventor: Andrew Ronnau, Los Alamitos, CA (US)

(73) Assignee: AUTONOMOUS AGENT TECHNOLOGIES, LLC, Cheyenne, WY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/531,598

(22) Filed: Aug. 5, 2019

(65) Prior Publication Data

US 2019/0357022 A1 Nov. 21, 2019

Related U.S. Application Data

(63) Continuation of application No. 16/186,149, filed on Nov. 9, 2018, now Pat. No. 10,375,541, and a continuation of application No. 14/217,173, filed on Mar. 17, 2014, now Pat. No. 10,129,716.

(51) Int. Cl.
| | |
|---|---|
| *H04W 24/00* | (2009.01) |
| *H04W 4/21* | (2018.01) |
| *H04W 4/02* | (2018.01) |
| *G06Q 10/10* | (2012.01) |
| *G06Q 50/00* | (2012.01) |

(52) U.S. Cl.
CPC ............ *H04W 4/21* (2018.02); *G06Q 10/10* (2013.01); *G06Q 50/01* (2013.01); *H04W 4/02* (2013.01)

(58) Field of Classification Search
CPC ....... H04W 12/08; H04W 12/06; H04W 4/50; H04W 4/24; H04W 48/16; H04W 28/0268
USPC ... 455/456.1, 414.4, 414.2, 414.1, 406, 405, 455/519
See application file for complete search history.

(56) References Cited

U.S. PATENT DOCUMENTS

| | | | | |
|---|---|---|---|---|
| 8,676,937 | B2* | 3/2014 | Rapaport | H04L 51/32 709/219 |
| 9,215,217 | B2* | 12/2015 | Abu-Hakima | H04L 12/1895 |
| 9,338,597 | B2* | 5/2016 | Abu-Hakima | H04W 4/90 |
| 9,535,563 | B2* | 1/2017 | Hoffberg | G05B 15/02 |
| 2010/0322215 | A1* | 12/2010 | Keller | H04W 36/0066 370/338 |
| 2012/0322484 | A1* | 12/2012 | Yu | H04W 4/08 455/509 |

* cited by examiner

*Primary Examiner* — Joseph Arevalo
(74) *Attorney, Agent, or Firm* — Barceló, Harrison & Walker, LLP

(57) ABSTRACT

Exemplary methods and systems are presented for social networking applications using autonomous mobile agents. Communication links are established based on geographic proximity and distance described as a domain in which resident agents are detected and identified. The communication links thus established allow platform independent communication along communication channels that are dynamically derived. Incorporation of computer machines and feature data sets (including attractiveness data) permit agent classification and inter-agent notification of classification results.

1 Claim, 19 Drawing Sheets

METHODS AND SYSTEMS FOR SOCIAL NETWORKING WITH AUTONOMOUS MOBILE AGENTS

CROSS-REFERENCE TO RELATED APPLICATIONS

This application is a Continuation of patent application Ser. No. 16/186,149, filed on 9 Nov. 2018, and patent application Ser. No. 14/217,173, filed on 17 Mar. 2014, which claims the benefit of Provisional Application Ser. No. 61/800,009, filed on 15 Mar. 2013, the contents of which are herein incorporated by reference in their entirety.

BACKGROUND OF THE DISCLOSURE

1. Field of the Disclosure

The disclosure relates generally to social networking methods and systems and specifically in certain embodiments to methods and systems for proximity-driven social networking applications implemented with autonomous mobile agents incorporating data mining and machine learning classification.

2. General Background

Mobile device users (agents) provide a platform for a social networking interaction that is motivated by groupings of proximate users, independent of other typical social network connections. Geographical proximity, and additional features proximity, provides categorizations which establish a set of proximate agents which are thus associated for interaction.

The information exchange between any two agents may be performed with open identity, or with partial or complete anonymity Types of data exchanged may be user-driven communication, user-defined auto-categorizations, and automatic machine classification operating on feature data inputs from associated agents.

Data mining and machine learning technologies may be used to develop automatic computer constructs for agents whom can operate on feature data sets from associated neighbor agents as input. Computer machine constructs within an agent perform classification operations on feature data sets from associated agents and the classification results may be communicated back to associated agents. This information exchange may be autonomously derived.

As an example, facial recognition technology (FRT) provides a means to derive feature data to describe the facial appearance of a user agent. Machine learning provides a technology by which the facial attraction preferences of an associated (proximate group) agent may be modeled. The computer machine of the associated agent may operate on the feature data set from the parent agent and thus classify the associated agent as attracted, or not attracted to the parent agent. This process allows the associated agents to be thusly classified. Classification using facial recognition technology (FRT) and machine learning is one example. Other classifications may be implemented into this structure.

It is desirable to address the limitations in the art, e.g., to apply methods and systems for proximity-driven social networking applications implemented with autonomous mobile agents incorporating data mining and machine learning classification.

BRIEF DESCRIPTION OF THE DRAWINGS

By way of example, reference will now be made to the accompanying drawings, which are not to scale.

DETAILED DESCRIPTION

Figure 1A:
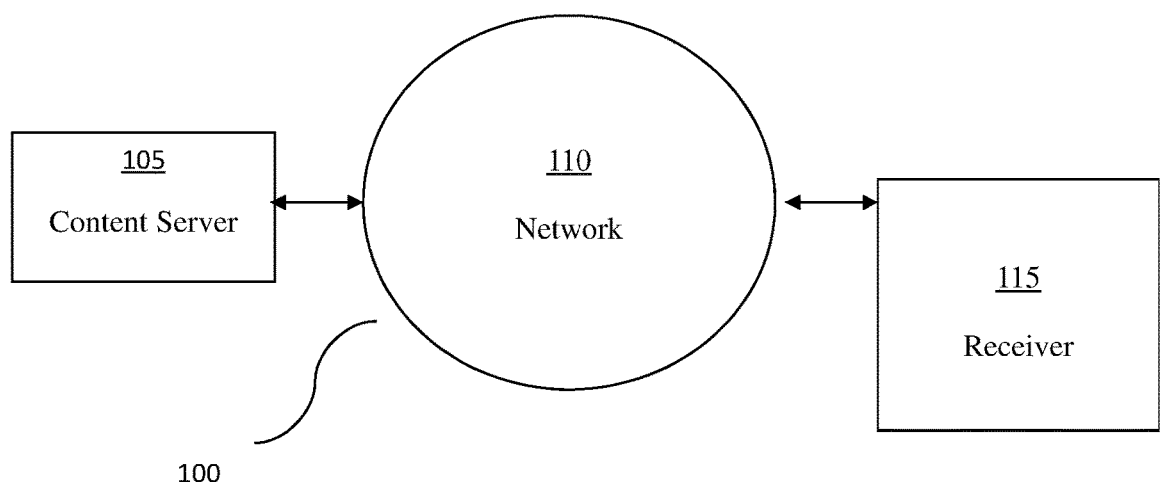
FIG. 1A illustrates an exemplary networked environment and its relevant components according to certain embodiments.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C # (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1A depicts an exemplary networked environment 100 in which systems and methods, consistent with exemplary embodiments, may be implemented. As illustrated, networked environment 100 may include a content server 105, a receiver 115, and a network 110. The exemplary simplified number of content servers 105, receivers 115, and networks 110 illustrated in FIG. 1A can be modified as appropriate in a particular implementation. In practice, there may be additional content servers 105, receivers 115, and/or networks 110.

In certain embodiments, a receiver 115 may include any suitable form of multimedia playback device, including, without limitation, a cable or satellite television set-top box, a DVD player, a digital video recorder (DVR), or a digital audio/video stream receiver, decoder, and player. A receiver 115 may connect to network 110 via wired and/or wireless connections, and thereby communicate or become coupled with content server 105, either directly or indirectly. Alternatively, receiver 115 may be associated with content server 105 through any suitable tangible computer-readable media or data storage device (such as a disk drive, CD-ROM, DVD, or the like), data stream, file, or communication channel.

Network 110 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 100 may perform one or more of the tasks described as being performed by one or more other components of networked environment 100.

Figure 1B:
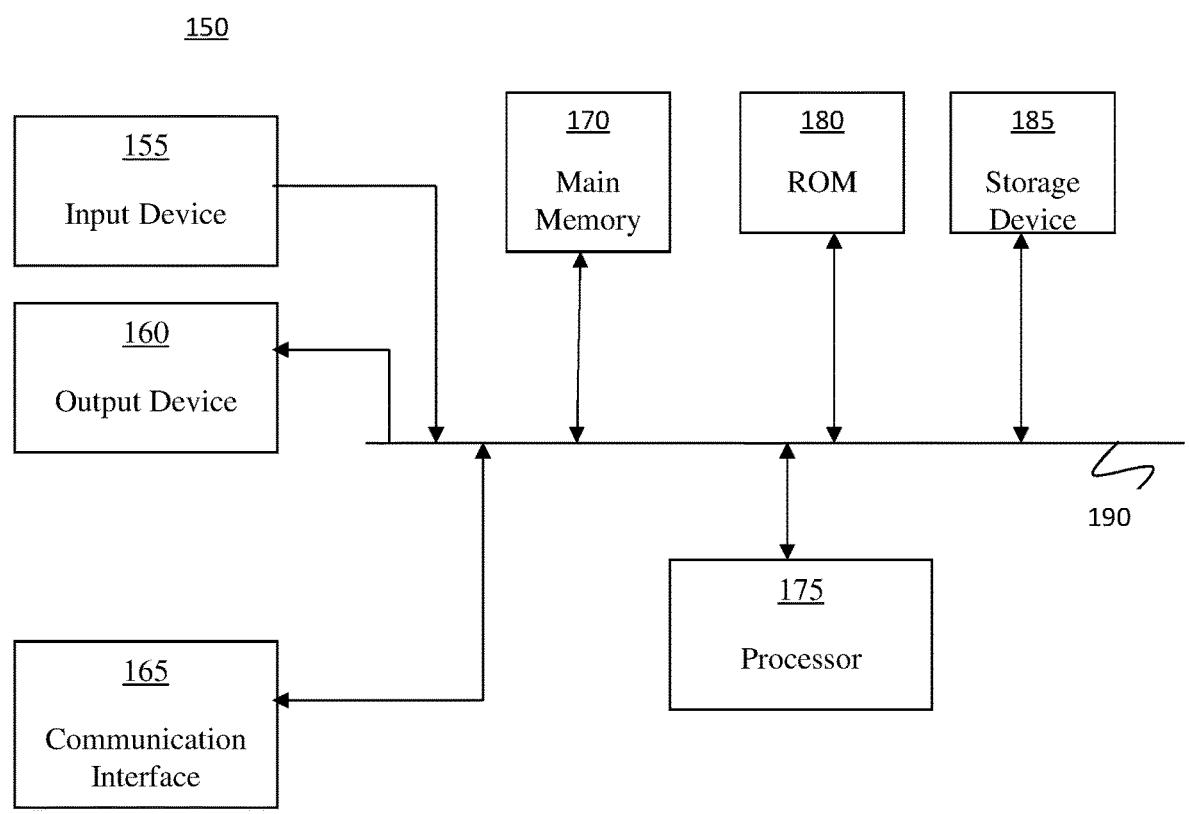
FIG. 1B is an exemplary block diagram of a computing device that may be used to implement certain embodiments.

FIG. 1B is an exemplary diagram of a computing device 150 that may be used to implement aspects of certain embodiments of the present invention, such as aspects of content server 105 or of receiver 115. Computing device 150 may include a bus 190, one or more processors 175, a main memory 170, a read-only memory (ROM) 180, a storage device 185, one or more input devices 155, one or more output devices 160, and a communication interface 165. Bus 190 may include one or more conductors that permit communication among the components of computing device 150.

Processor 175 may include any type of conventional processor, microprocessor, or processing logic that interprets and executes instructions. Main memory 170 may include a random-access memory (RAM) or another type of dynamic storage device that stores information and instructions for execution by processor 175. ROM 180 may include a conventional ROM device or another type of static storage device that stores static information and instructions for use by processor 175. Storage device 185 may include a magnetic and/or optical recording medium and its corresponding drive.

Input device(s) 155 may include one or more conventional mechanisms that permit a user to input information to computing device 150, such as a keyboard, a mouse, a pen, a stylus, handwriting recognition, voice recognition, biometric mechanisms, and the like. Output device(s) 160 may include one or more conventional mechanisms that output information to the user, including a display, a projector, an A/V receiver, a printer, a speaker, and the like. Communication interface 165 may include any transceiver-like mechanism that enables computing device/server 150 to communicate with other devices and/or systems. For example, communication interface 165 may include mechanisms for communicating with another device or system via a network, such as network 110 as shown in FIG. 1A.

As will be described in detail below, computing device 150 may perform operations based on software instructions that may be read into memory 170 from another computer-readable medium, such as data storage device 185, or from another device via communication interface 165. The software instructions contained in memory 170 cause processor, 175, to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 150. The web browser may comprise any type of visual display capable of displaying information received via the network 110 shown in FIG. 1A, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 110. The computing device 150 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 150 and/or the network 110. For example, source data or other information received from devices connected to the network 110 may be output via the browser. Also, both the browser and the browser assistant are capable of performing operations on the received source information prior to outputting the source information. Further, the browser and/or the browser assistant may receive user input and transmit the inputted data to devices connected to network 110.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

The building blocks of a system according to certain embodiments consist of a universe of agents (typically embodied as mobile users), a proximity discrimination module, a classification module, and notification interface. The structure and implementation of the system in certain embodiments, and of each of its building blocks, are described below and depicted in the accompanying figures.

Figure 2:
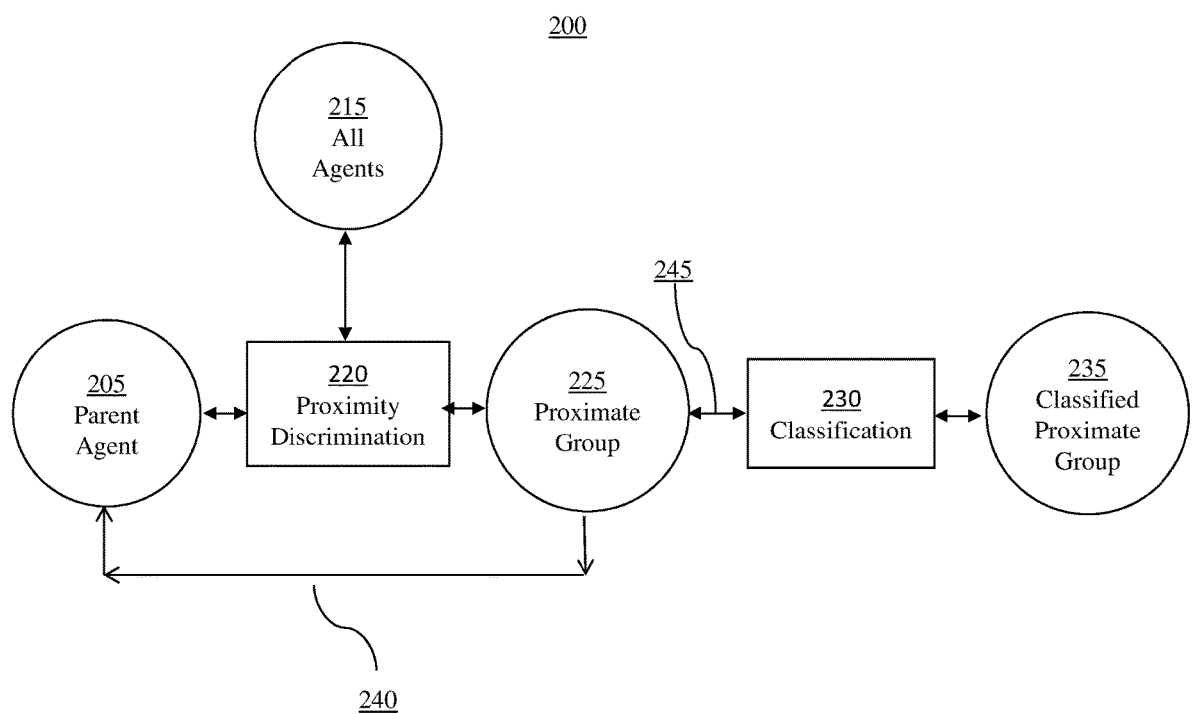
FIG. 2 is an exemplary block diagram of a network that may be used to implement certain embodiments.

FIG. 2 depicts an exemplary networked environment 200 in which systems and methods, consistent with exemplary embodiments, may be implemented. As illustrated, networked environment, 200, will include a proximity discrimination module (discrimination module), 220, and a classification module, 230. The parent agent, 205, initiates a query in which the discrimination module, 220, discriminates the group of all agents, 215, to a proximate group, 225. The discrimination parameters may be refined in an iterative process, 240. The classification module, 230, further operates on the proximate group to yield the classified proximate group, 235. An abbreviated structure may be utilized in which classification is not performed, 245.

The group of all agents, 215, consists of all members participating in the system. Members of the system may consist of, but are not limited to, users with cell phones, tablets, desktops, and shared environment computational devices.

The parent agent, 205, is a subgroup of all agents which typically consists of a single member. An agent may be designated as parent agent by specifying a set of parameters for proximity discrimination. In implementations where a single agent functions as parent agent, one or more agents, or all agents, may independently serve as the parent agent.

The functional concept according to certain embodiments is that a neighborhood of users can be established about some location. Communication between the users in the proximate subgroup may be established. Additional operations (classifications) may be performed and communicated openly or anonymously so that the parent (or other) agent knows some characteristic of the associated neighbor agents. For example, the parent agent may know that there are 20 Republican in the proximate group and 10 others. Relative geographic data may be included in the inter-agent exchange to be communicated to an agent. For example, the parent agent may see that of the 30 agents in the room, 20 of them are Republicans, and they are all at the front of the room.

Referring back to the exemplary embodiment depicted in FIG. 2, the discrimination module, 220, consists of a system by which the proximate subgroup, 225, is determined.

The proximate group, 225 consists of the subgroup of all users that are within specified proximity to geographical position data and/or proximity input parameters specified by the parent agent, 205.

The proximate group, 225, is the group of agents amongst which inter-agent communication may occur.

Figure 3:
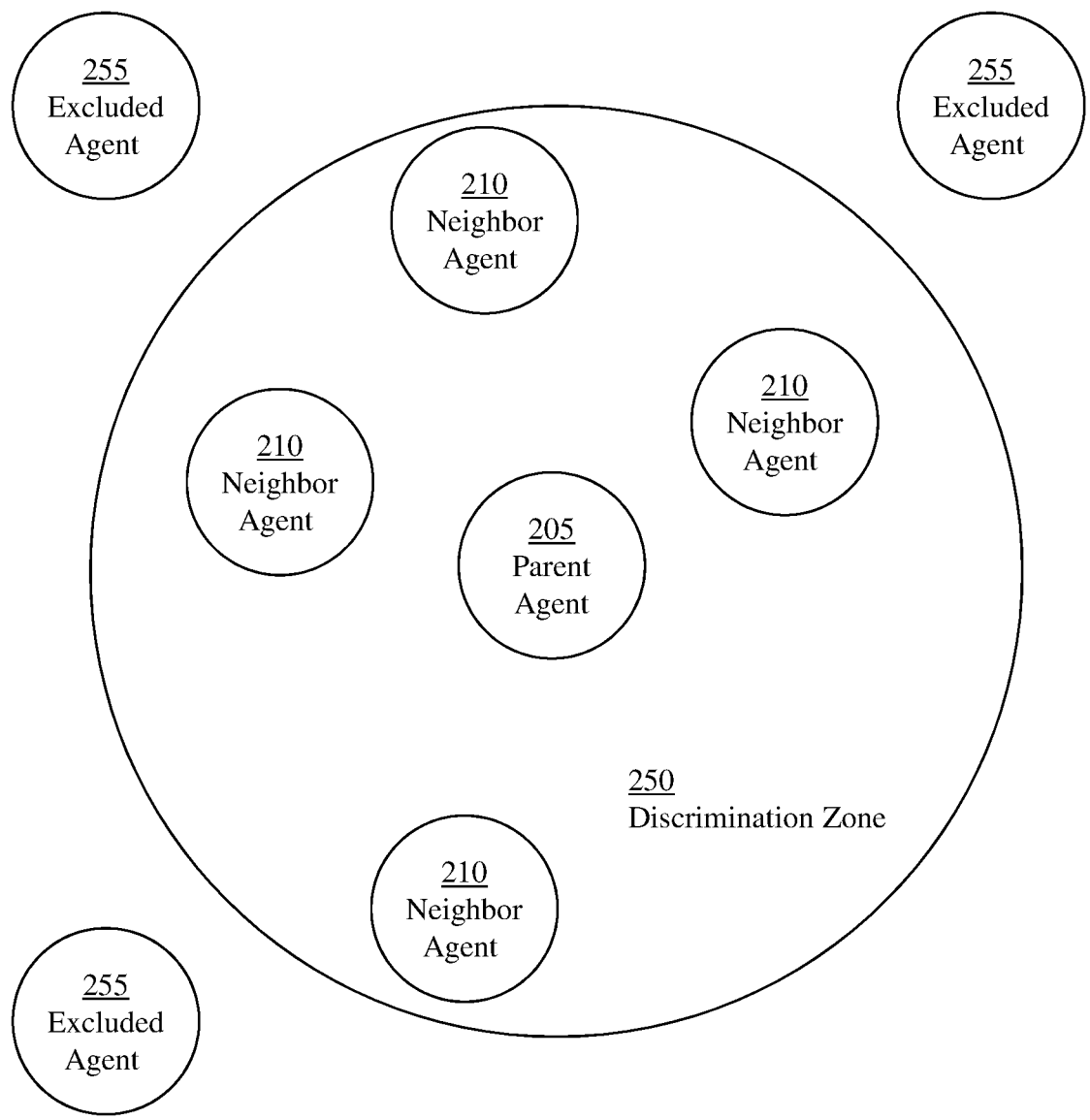
FIG. 3 illustrates an exemplary environment of agents in which the proximate group (neighbor group) is shown within the discrimination domain.

FIG. 3 depicts an exemplary proximate group of associated agents consisting of the parent agent, 205, and associated neighbor agents, 210, that are all within the discrimination zone, 250, and excluded agents, 255, that are not part of the associated neighbor group.

Note that for each of the agents that functions as a parent agent, the resultant proximate group may be different.

It may be possible to specify parameters such that the discrimination zone does not contain the parent agent.

Proximity parameters may be of any qualitative nature. Examples of such proximity parameters include, but are not limited to, hair color, age range, height range, political affiliation, and the like.

Proximity parameters may be geographical, e.g., at (or within 0.25 mile of) latitude/longitude coordinates 34.8940, −117.0472. Other parameters may be used, depending on the requirements of each particular implementation. For example, the proximity parameters may specify teenage males within the boundaries of Disneyland, Calif. As another example, the proximity parameters may specify a domain that is within 50 feet of the centerline of Colorado Blvd, in Pasadena, Calif., during the period from 8:00 AM to 11:00 AM on Jan. 1, 2016.

The parameters may be specified which create a collection of domains which are not contiguous. For example, the proximity parameters may specify the collection of domains defined as within 100 feet of any of the In-N-Out® Burger restaurants in Long Beach, Calif.

The discrimination operation may be parametric only, utilizing agent inputs.

In one exemplary implementation, the discrimination operation may perform in whole or in part using agent position data. For example, individual agents, or groups of agents may be added to or removed from the proximate group using a map display depicting the relative position of agents.

In certain embodiments, the discrimination module, 220, may consist of a remote server which receives geographic position data and/or additional proximity input parameters from all agents, 215, to discriminate the subgroup of all agents that are within specified proximity to geographical position data and/or proximity input parameters of the parent agent, 205.

In certain embodiments, the discrimination module, 220, may consist of a set of operations that are performed on one or more agents without communication with a remote device to perform the discrimination operation.

Figure 4:
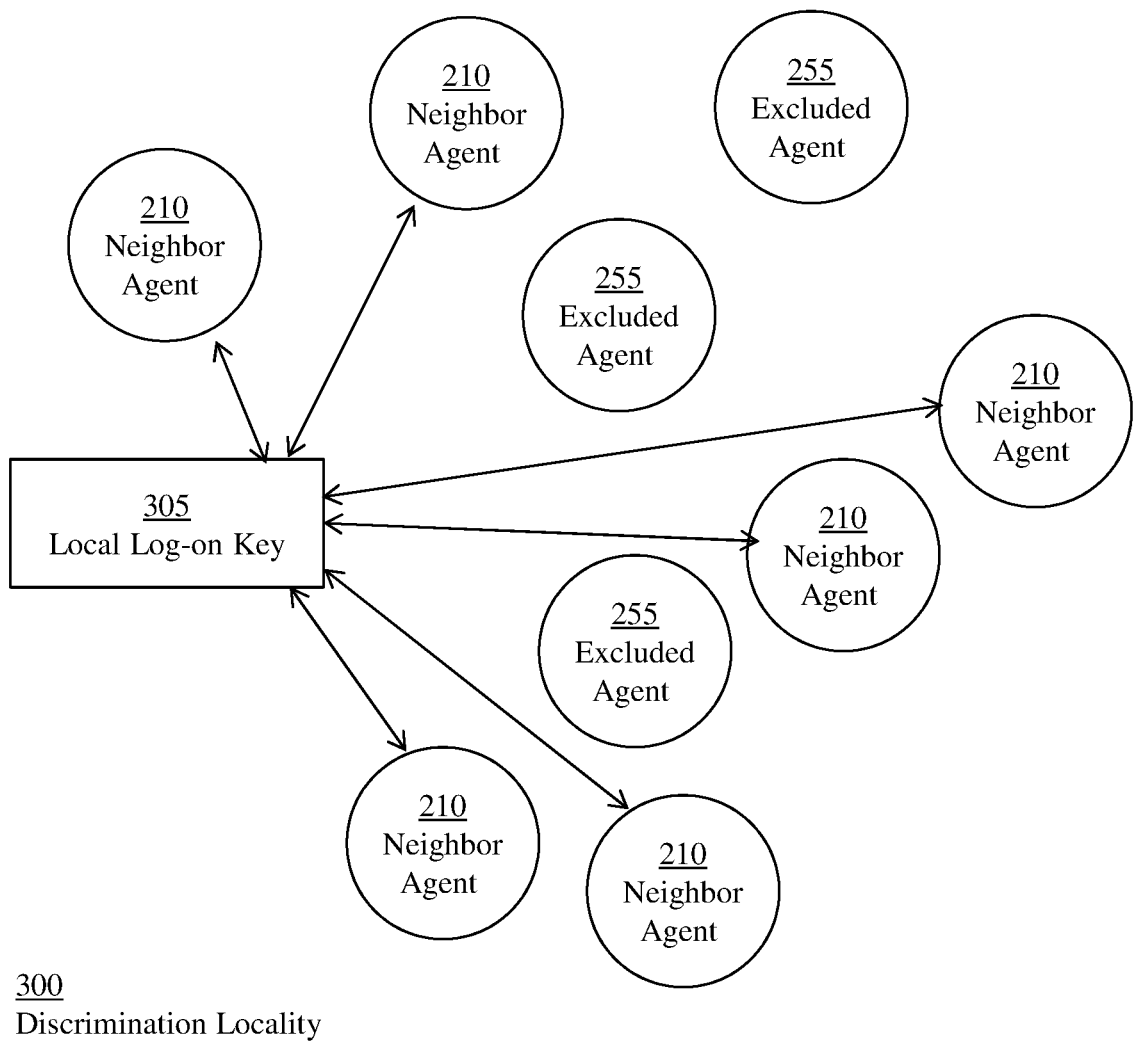
FIG. 4 illustrates an implementation in which the proximate zone is established with locally provided log-on key.

In certain embodiments, the discrimination module, 220, may consist, in part, of a proximity key, e.g., a log-on displayed at a bar, to facilitate an associative collection of participating agents at that location. This is depicted in FIG. 4, in which a proximate group of neighbor agents, 210, are established at some locality, 300, using the locally provided log-on key, 305. Agents that do not apply the log-on key comprise the group of excluded agents, 255.

The element that provides the log-on key, 305, may serve as a parent agent, or may simply be a mechanism to provide a log-on process initiated by an agent within the local group, or by an agent external to the local group.

Figure 5:
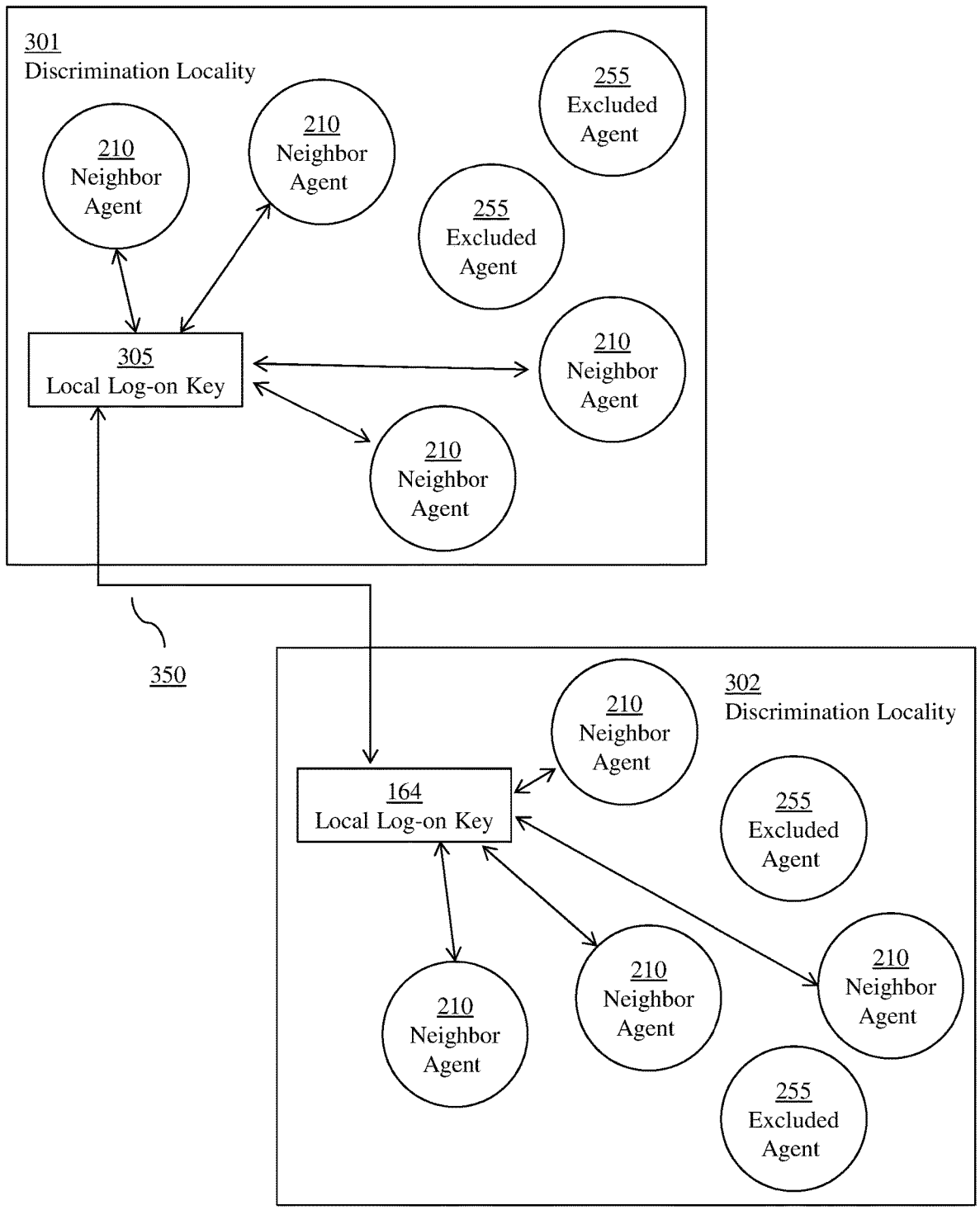
FIG. 5 illustrates an implementation in which the proximate zone is established with a log-on key provided at more than one location.

A log-on key may be provided at different locations to establish a proximate group consisting of geographically remote subgroups, as depicted in FIG. 5, which shows two remote localities, 301 and 302, in which a log-on key, 305, is provided at more than one location via a communication link, 350, to establish a proximate group of neighbor agents, 210. Agents that do not apply the log-on key comprise the group of excluded agents, 255.

Referring back to exemplary diagram in FIG. 2, upon development of a proximate group, 225, the proximity parameters may be modified, 240, whereupon the proximate group is re-evaluated. This process may be repeated and adjusted any number of times.

Figure 6:
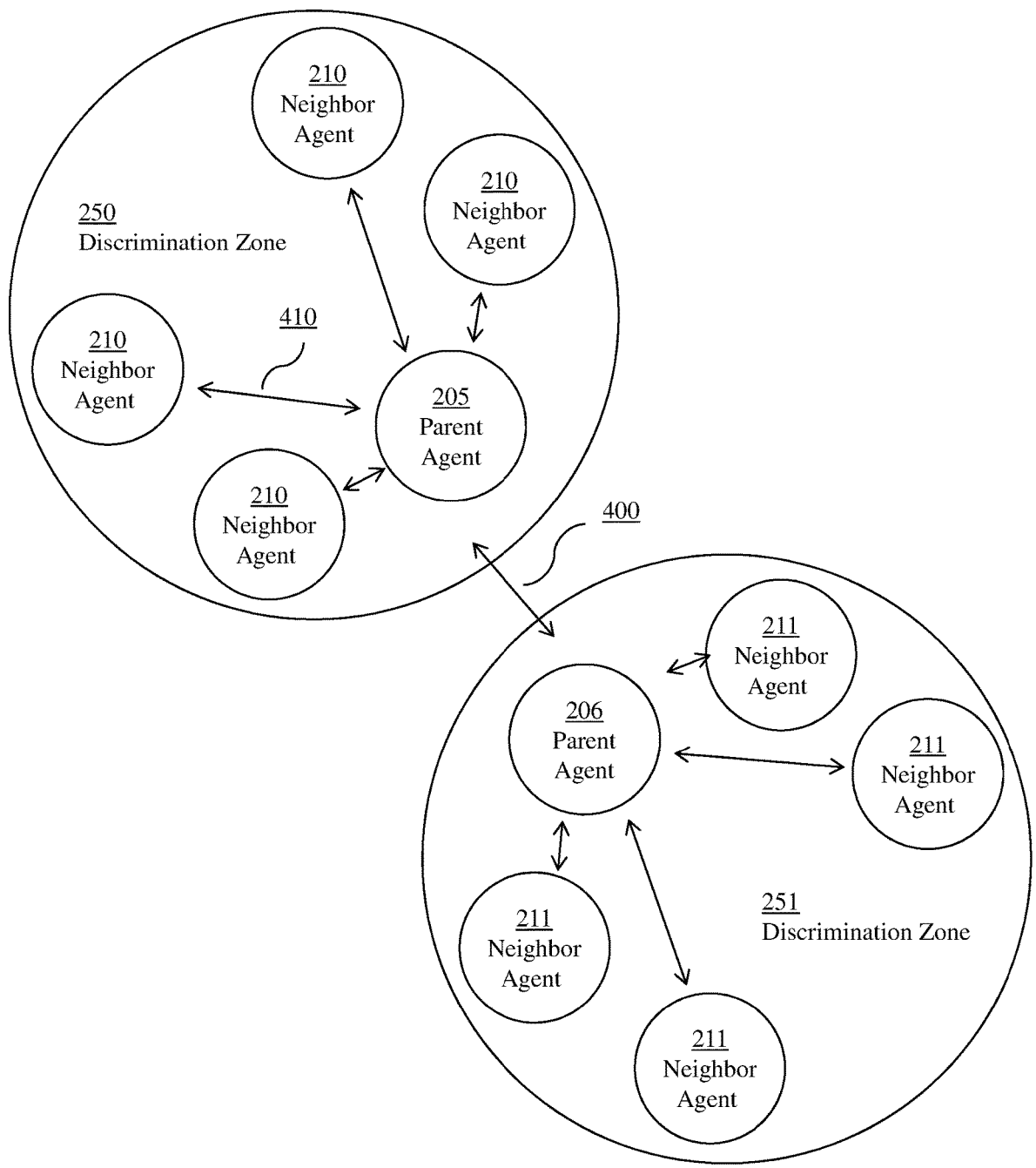
FIG. 6 illustrates and exemplary environment of agents created by joining two remote proximate zones.

Remote proximate groups may be joined into one proximate group comprised of remote groups of associated agents, as shown in FIG. 6, which shows the proximate group within the discrimination zone, 250, composed of a parent agent, 205 and associated neighbor agents, 210, and the proximate group within the discrimination zone, 251, composed of a parent agent, 206 and associated neighbor agents, 211, joined, 400, to form one effective associated group The joined group thus formed may have either parent agent, 205, or 206, assume the role as the joined group parent agent.

A proximate group may have more than one parent agent.

The role of parent agent may be switched amongst agents, or shared amongst agents.

A proximate group of associated agents may be broken into more than one smaller disjoint proximate groups.

The grouping thus established may be temporary, with associations expiring in a fixed time, or expiring after there has been a lapse of inter-agent communication for a fixed time.

The groupings thus established may be saved, e.g., the group that was at the bar on Friday night.

The proximity group may be geographically transient, in which the group consists of agents that are within a certain geographical proximity to a location, e.g., the parent agent's location, which may be moving. As an example, consider agents in cars on the highway, wherein the proximity group consists of agents that are sufficiently near to the car transporting the parent agent. In essence, the discrimination zone, 250, as shown in FIG. 3 moves with a moving parent agent.

In another exemplary implementation, the proximity parameters may be specified such that the proximity region does not follow a parent agent, but does move. As an example, a zone may move with a float in a parade, even though no parent agent is moving with the float.

Figure 7:
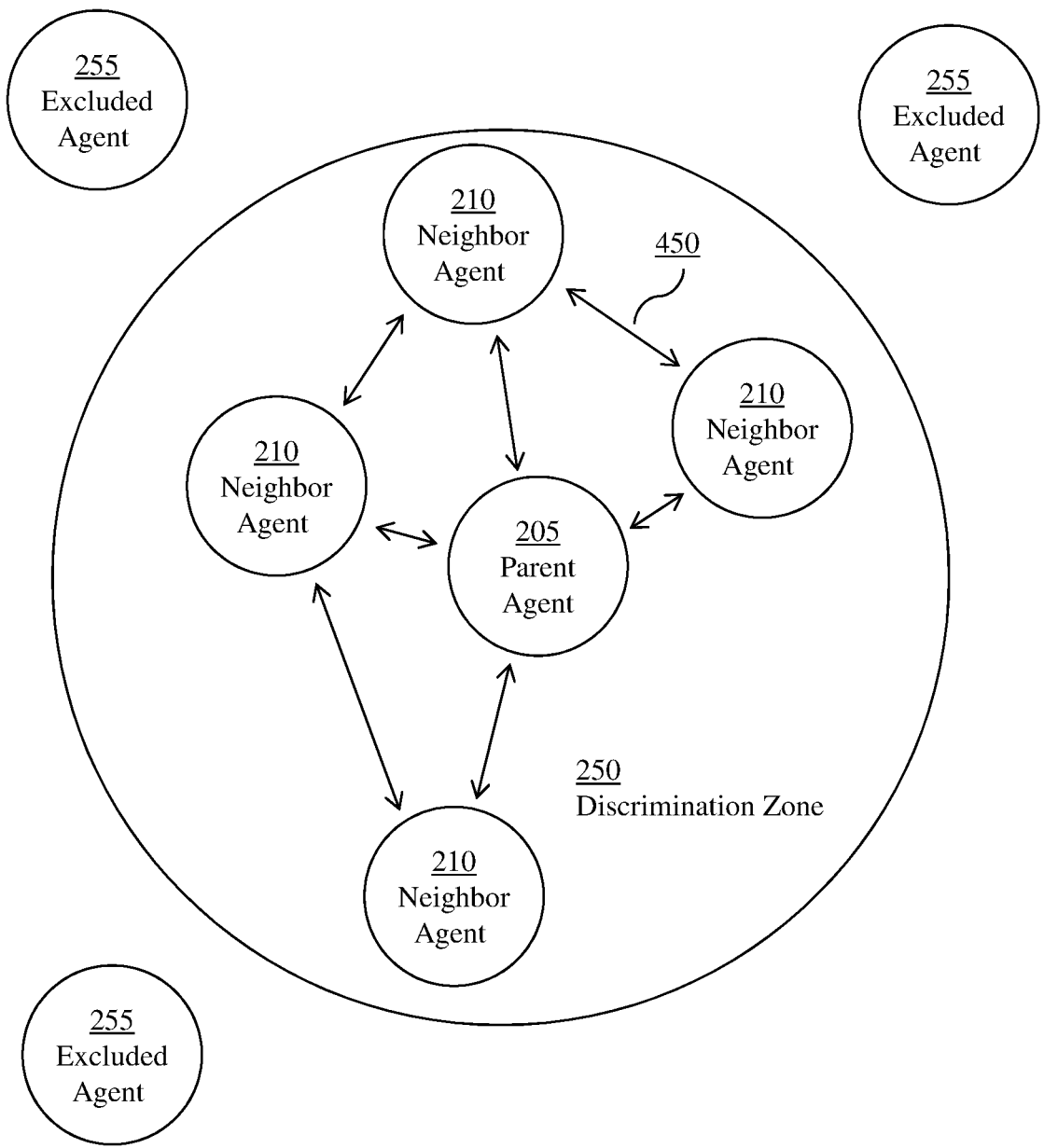
FIG. 7 illustrates the inter-agent communication in a proximate subgroup, independent of any classification operation.

In one embodiment, communication and notification may commence, and continue between agents in the proximate group, 225, with our without classification. This is shown in FIG. 7, in which the parent agent, 205, and associated neighbor agents, 210, within the discrimination zone, 250, communicate, 450. Agents, 255, outside of the discrimination zone are excluded from the communication.

In one implementation, each neighbor agent communicates only with the parent agent (restricted communication).

In one implementation, all agents may communicate to each other agent in the proximate group (open communication).

In one implementation, communication permissions may be different for different agents (structured communication).

In one implementation the communication structure may be initialized, but is not locked such that the communication structure may emerge based on agent level decisions (free communication)

The inter-agent communication may include notification to the parent agent of the existence of each neighbor agent (anonymous notification).

The communication to the parent agent may also include relative positional data, and possible additional neighbor agent data (non-anonymous notification).

The inter-agent communication may include notification to the neighbor agent that the neighbor agent has been discriminated into a proximate group (anonymous notification).

The communication to the neighbor agent may also include relative positional data, and possible additional neighbor agent data (non-anonymous notification).

The inter-agent communication structure may be configured such that combinations of one-way, two-way, anonymous, and non-anonymous communication are used within an agent group.

The communication may also include any combination of directed communications, not limited to, text messages, emails, file transfers, and stored photo exchanges, real time photo exchange, stored video exchange and real time video.

The classification module, 150, comprises hardware and or software that transmits and receives feature data, and that operates on feature data which classifies the agents relative to the feature data.

The classification information which may be exchanged between agents is in addition to the inter-agent communication described herein.

In one embodiment, the classification operates on feature data from an agent of the proximate group, generally the parent agent, which classifies the associated neighbor agent relative to the feature data.

In one embodiment, the classification operates on directed inputs from one or more participants in the associated neighbor group (auto-classification).

In one embodiment, the classification operates on directed inputs or data mined from about one or more sources that are not in the associated neighbor group (external auto-classification). For example, the agents may be classified as members of an organization, e.g., The Sierra Club.

The classification module may consist of classification operations executed on a distributed platform. Such computations may be performed in residence on the agent, or in part or in whole utilizing computational resources external to the agent.

Depending on the requirements of each particular implementation, the classification module may consist of combinations of the classification module examples described above.

The classification operation may be one that provides results which may are qualitative.

The classification operation may be one that provides results which may are binary.

The classification operation may be one that provides results which may are variable.

The classification operation may be one that provides results which are a derived types with any combination of types described herein.

The classification operation may be dynamically driven via inter-agent communication. For example, a member of an active proximate subgroup at a lecture may send out a classification query, e.g., "likes speaker." The complementary members of the proximate subgroup may actively auto-classify into the binary groupings, e.g., "like the current speaker," or "dislike the current speaker."

The classification may be parametrically stored in the agent structure. The information may be transient and stored only during the period of participation in the particular associated proximate group.

In one implementation, the classification query, for selected layers, is initiated by the parent agent. The feature data is transmitted to the associated proximate subgroup neighbors, and the classification results are obtained for each member of the proximate group. The classification results are transmitted to the parent agent.

Figure 8:
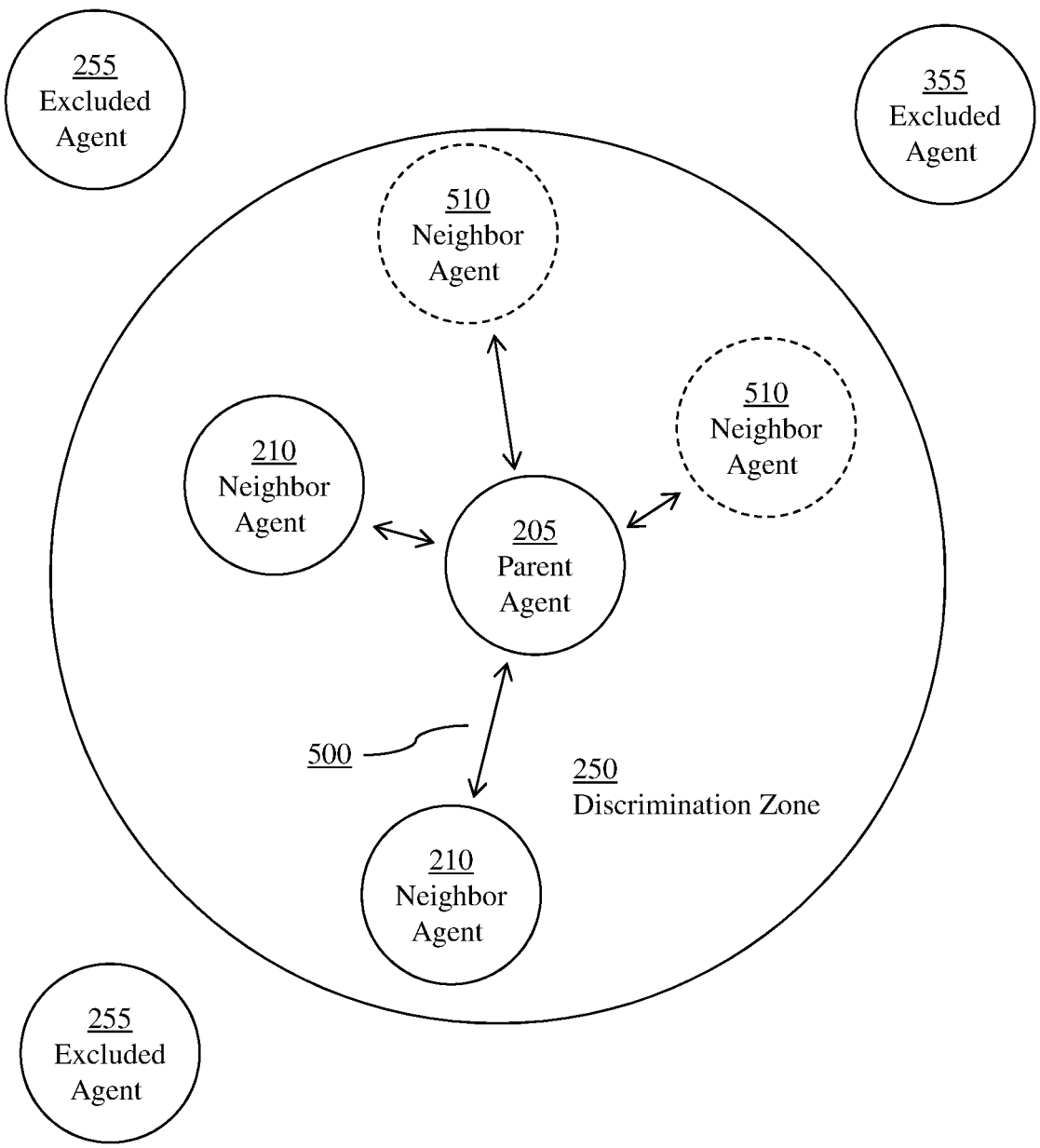
FIG. 8 illustrates the inter-agent communication for the classification operation in an exemplary environment proximate subgroup of agents in which the proximate group (neighbor group) has been classified.

This classification is shown in FIG. 8, which shows the subgroup of elements in a binary classification operation. A classification query, 500, from the parent agent, 205, to elements within the discrimination zone, 250, which activates the classification process on each associated neighbor agent. In FIG. 8, the binary classification results are depicted schematically as classified neighbor agents with either a solid border, 210, or with a dashed border, 510. The classification results are transmitted, 500, back to the parent agent, 205.

Agents, 255, outside of the discrimination zone are excluded from the classification operation.

The data exchange and classification may not provide notification to the associated neighbor agent that the classification occurs (one-way anonymous classification).

The data exchange and classification in may also include relative positional data, and possible additional neighbor agent data (one-way non-anonymous notification).

The data exchange and classification may include notification to the neighbor agent that the classification occurs (anonymous classification).

The communication to the neighbor agent may also include relative positional data, and possible additional neighbor agent data (non-anonymous classification).

The data exchange and classification structure may be configured such that combinations of one-way, two-way, anonymous, and non-anonymous communication and exchange are used within an agent group.

In certain embodiments, neighbor member agents may initiate a classification query within the active existing proximate group, and receive classification data, as acting parent agent.

Figure 9:
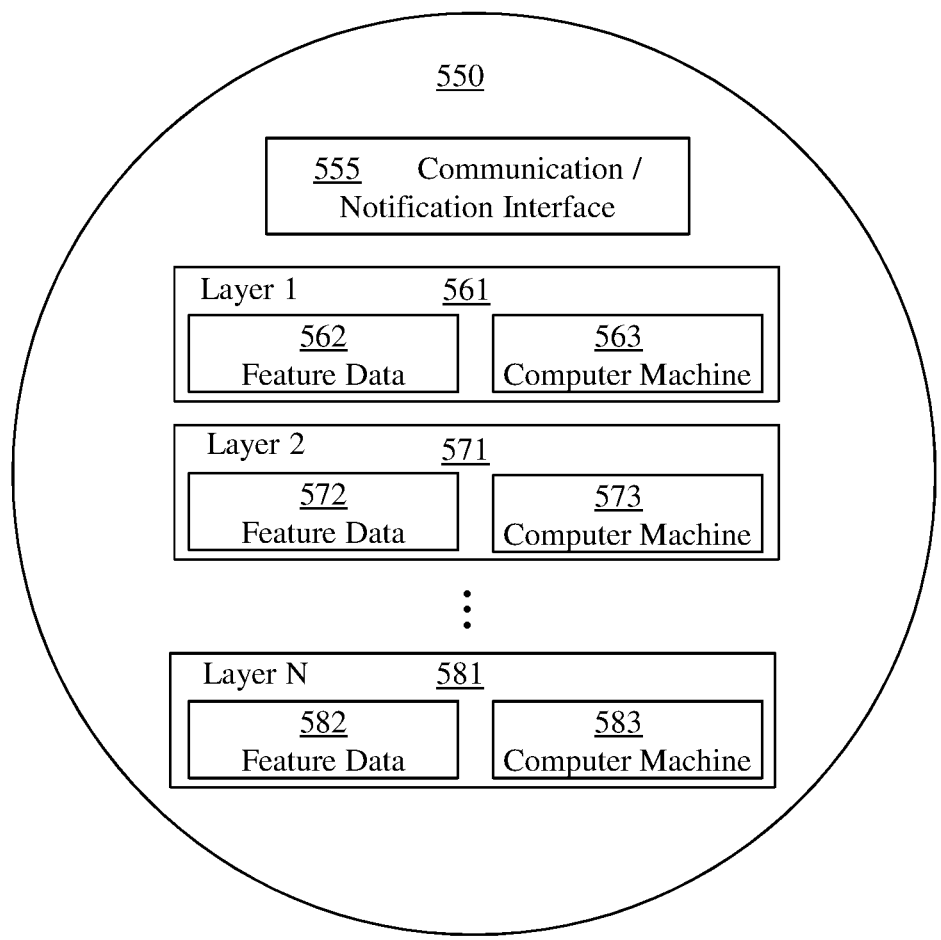
FIG. 9 is a schematic diagram of a prototypical agent structure as implemented herein.

FIG. 9 depicts an exemplary structure of a prototypical agent, 550, including the communication/notification interface, 555, and three data layers, 561, 571, and 581. Each of the three layers has a feature data component, 562, 572, and 582, respectively, and corresponding computer machine components, 563, 573, and 583, respectively.

The executive information principal to each data layer contains the layer name, and status, i.e.; active/inactive.

Note that although the data layers are shown in the figure, the number of data layers may vary by agent, and by implementation.

The communication/notification interface, 555, may send and receive data from associated agents, from external entities, and from direct user input/output.

Communication to and from other agents may be in the form of wireless network transmissions, or hardwired network transmissions.

Communication to and from other agents may be in the form of wireless, or hardwired signals independent of any internet, or intranet.

Communication to and from other agents may by way of audible or inaudible sound or vibration or other form of transducer interaction.

Communication to and from other agents may by way of infrared, or any other band of EMF.

The communication/notification interface to the user may consist of any suitable combination of audible, sensory, text, touch, and graphical input and display used to facilitate the implementations described herein.

In one exemplary implementation, the interface consists of a graphical map display which shows the relative positional data, as available, of agents in the proximate group.

Classification and notification data may be displayed as coloration, text tagging, or other visual indications associated with proximate agents.

Communications and data may be associated and accessible with user interaction, For example, classification results may be displayed in a drop down layer type display structure.

Different communication and notification interface implementations may be used for different aspects of inter-agent classification and communication.

Combinations of different notification and input modes may be used.

Communication and notification may be implemented on any suitable electronic device. Note that the communication and notification may be exchanged using a device other than the agent to or from which said communication is directed. For example, a laptop computer may be used to view a map like environment representing the proximate group of agents as displayed for one of the member agents, although said member agent may be embodied by a user with a cell phone.

The layer structure, consisting of feature data and computer machine may be used to develop classification data beyond communications established between agents in the proximate group.

The feature element of each layer has the data structure for the classification, and contains the relevant data that may be necessary for the classification.

The layer structure may be dynamic.

The computer machine has the construct necessary to classify the feature data input from an agent.

The feature data component and computer machine component of each classification layer may be completely different, or may have the same structure as for other layers.

The classification may be dynamic (performed in real time upon the request query), or it may be stored as part of the agent structure.

In one implementation, the classification layer may consist of feature data and computer machine to provide a binary classification, i.e.; and is or is not classification relative to a category per the feature data.

The binary classification may be a self-categorization (auto classification), e.g.; male. The feature data set consists of the data descriptor (which may even be the same as the layer name), and the computer machine consists of the categorization which may be set dynamically or may be pre-set.

Figure 10:
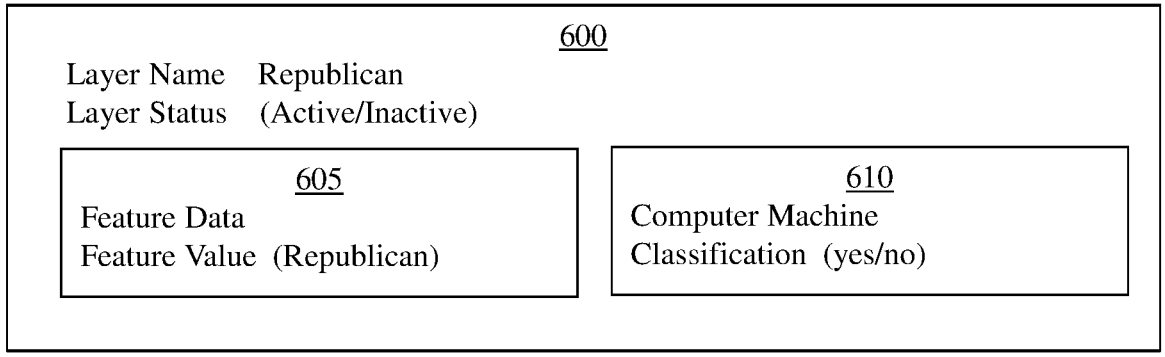
FIG. 10 is a diagram of an agent layer structure for an example binary classification.

In one implementation, the feature data will contain the data name, and the categorization will simply have the result of the auto-categorization. An exemplary layer structure for a binary feature/classification layer is shown in FIG. 10, in which the data layer, 600, shows executive structure, i.e.; layer name and status. The feature data component, 605, contains a binary classification element, "Republican". The computer machine component, 610, holds the binary classification switch for each corresponding element of the feature data.

The computer machine may be simply an external categorization, by another agent or organization. For example, the layer may be Sierra Club membership, and the feature data consists of personal identity information, and the classification (is a member, or is not a member) is provided to the layer by the Sierra Club.

Figure 11:
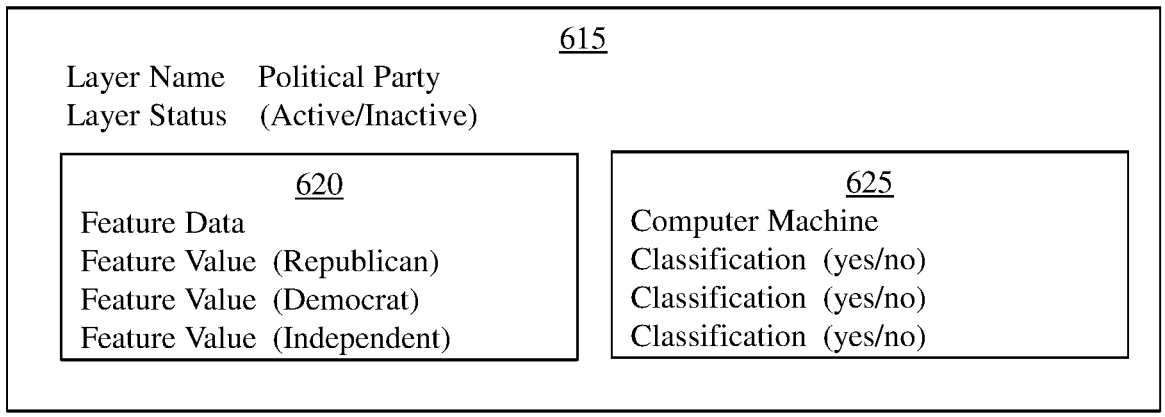
FIG. 11 is a diagram of an agent layer structure for an example binary multiplex classification.

In an additional implementation, the classification layer may consist of feature data and computer machine to provide a multiplex classification, of several possible variables. Such a layer is similar to the construct of multiple binary layers. An exemplary structure is shown in FIG. 11, showing a multiple binary classification layer, 615. The feature data component, 620, contains three binary classification elements, "Republican", "Democrat", and "Independent". The computer machine component, 625, holds the binary classification switches for each corresponding element of the feature data.

Figure 12:
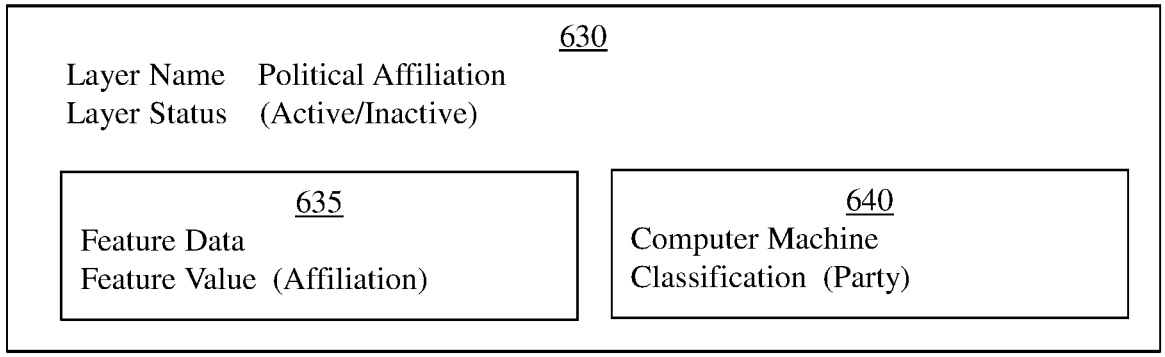
FIG. 12 is a diagram of an agent layer structure for an example multivariate classification.

In another implementation, the classification layer may consist of feature data and computer machine to provide a multivariate classification. Such a layer may classify in a manner that is not binary, but rather has multiple possible answers. An exemplary structure is shown in FIG. 12, showing a multivariate classification data layer, 630. The feature data component, 635, and computer machine component, 640, are structured appropriately for a classification that admits some range of possible answers.

The multivariate example, "Political Affiliation", shown In FIG. 12 admits a discrete multivariate classification, i.e.; "Republican", or "Democrat", or "Independent", etc. It is also possible to have a continuous multivariate classification, for example, "Height", in which case the possible classification is number from a continuum.

The classification structures may consist of auto-categorizations, or externally derived classifications.

In one embodiment, the classification is performed by the computer machine using data mining techniques.

In one embodiment, the computer machine may consist of statistically derived group preferences using agent data, Feature data may consist of sufficient agent (personal) information from which the computer machine may make data mining inquiries over external data bases. The computer machine may extract data from internet sources, social networks, and other social media, e.g., Twitter, from which the computer machine may classify the agent.

Feature data in the form of other classifications or categorizations may be used by the computer machine to classify using data mining techniques. For example, a computer machine may suggest that there is a strong correlation between National Rifle Association membership and Republican political registration. Thus, if the feature data from an agents contains the classification "National Rifle Association", then the computer machine may thus classify the agent as "Republican".

The feature data may serve as input to a computer machine that is statistically constructed. For example, the computer machine for an associated neighbor agent may contain the statistical construct that the agent has a preference for blond women between 20-25 years old. That associated agent would thus be classified as attracted to a parent agent that is a 22-year old blond.

Combinations of said feature data and classification operations may be used.

Feature data may consist of descriptive elements that are specifically tailored to special classification computer machines. For example, an attraction classification may use feature data that is abstract, such as eigenvectors from image principle component analysis, or other image processing feature extractions.

The computer machine to operate on such abstract feature extractions may also rely on training and parameterization using abstract feature data sets.

The agent structure and classification mechanisms described permit additional implementations somewhat outside the notion of communication and classification within the proximate agent group.

Entities mentioned herein may be people, corporations, groups, products, institutions, etc.

Such an exemplary implementation is one in which entities rather than participating agents are classified for the parent agent. For example natural language processing may be utilized to perform sentiment analysis on a collection of publications to determine the political disposition of a newspaper author.

In such an exemplary implementation, news articles may be tagged following the inclinations (as derived by the analysis) of the author.

Other data mining and analysis methodologies may be implemented. For example, correlative models may associate membership in some specific group with a certain political affiliation.

Such data mining and analysis models may be implemented on the system level, or may be implemented at the agent level. Such models may be individually derived, or may be made available by the system institution.

Other similar versions of such implementations are possible using data mining and natural language processing analysis directed at entities to be classified.

Agent input may also be used to verify or refute such classifications. Data obtained from such processes provide relative classification placements.

Such models described herein, embodied in the computer machine element within an agent, may be stored, shared, exchanged, created, and modified as utility objects.

Such classification may consist of classification operations executed on a distributed platform, on the agent level, or in part or in whole utilizing computational resources external to the agent.

Figure 13:
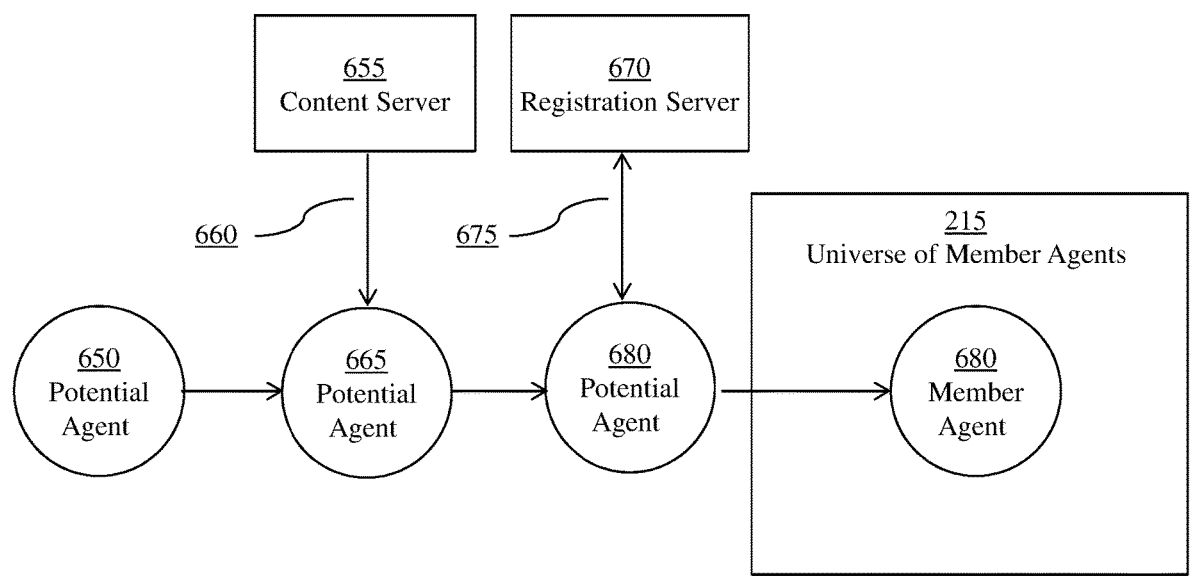
FIG. 13 depicts the agent initialization process.

The body of agents for the implementations described herein is created through an initialization process shown in FIG. 13.

A potential agent, 650, downloads the application software, 660, from a content server, 655. The potential agent with the software, 665, then registers, 675, with the software registration server, 670, whereupon the agent becomes a member agent, 680, and is a member of the collective universe of member agents, 215.

The collective universe of agents, 215, is the group from which all parent agents and proximate groups may be drawn.

It is possible for an agent to reside in a refined sub-universe of agents. Said refinement is a semi-permanent step of group discrimination, as described above.

Note that the content server, 655, and the registration server, 670, are process entities, which may be embodied on the same device, or on multiple devices.

The download, 660, and registration, 675, processes may be accomplished in one step or multiple steps.

The potential agents consist of, but are not limited to, users with cell phones, tablets, desktops, and shared environment computational devices.

It may be possible for an agent to have more than one member presence on a single device, i.e., different user profiles.

Figure 14:
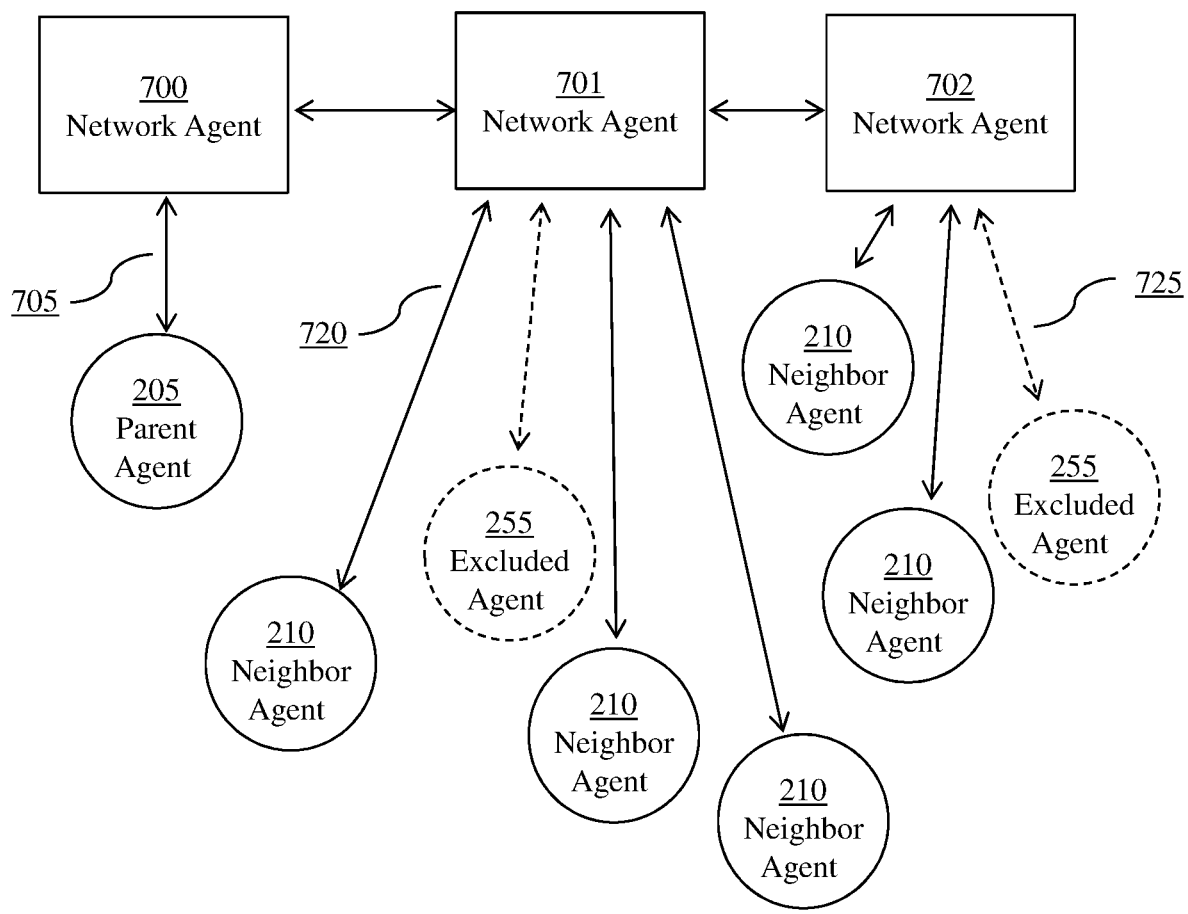
FIG. 14 depicts the network discrimination process to determine a proximate group.

FIG. 14 schematically depicts the process of forming a proximate agent subgroup. The parent agent, 205, initiates a discrimination request, 705, which is transmitted to the network agent, 700.

The discrimination request may contain any combination of geographic location data, and discrimination parameters. The network agent, 700, may forward the discrimination request to other network agents, 701, 702.

One or more of the network agents may then initiate communication, 720, to and or from the group of agents covered by the network agents. The location parameters, and or any additional discrimination parameters are then used to distinguish the appropriate proximate neighbor subgroup agents, 210.

It certain implementations, it may be possible for agents in the universe group to utilize preference filters to prevent their incorporation into certain parent agent proximate groupings.

In certain embodiments, preference filters on the proximate group restrict inclusion to certain features. Said preference filters may be provided by the parent agent. Said preference filters may be implemented at the system level.

Agents, 255, that do not meet the proximity classification requirements and/or preference filters are excluded from the associated neighbor group.

In one exemplary embodiment, an existing proximate group will have an associated log-on key so that agents may be joined in to the proximate group following the structure in FIG. 4.

Such log-on key usage may be open (all agents), or limited (some agents), or restricted (parent agent) only. Such log-on usage may be determined at the system level. Combinations of the usage structure may be used.

In certain implementations, it may be possible for agents that have been discriminated into a proximate group to sever ties with (to leave) the proximate group.

The neighbor agent subgroup(s) and communication links thus established are then used, in part, for subsequent communication and classifications as shown in FIG. 7 and FIG. 8.

The proximate group associations and communications channels may be stored for semi-permanent use. In such instances, the associates are maintained even if a subsequent discrimination request, using the exact same parameters, would not result in the same proximate group.

The proximate group associations may be programmed to terminate in a specified time, or may be terminated instantaneously by the parent agent.

In one implementation, and agent may be removed from the proximate group following a period of inactivity.

The temporal nature of the agent membership in the proximate neighbor group is established by combinations of preference settings of the parent agent, the neighbor agent, and the system parameters.

The settings established during the initialization process determine the communications that transpire during the discrimination operation.

In certain implementations, the communication settings may be adjusted by some or all of the user agents.

The communication settings may be different for different agents in the proximate group.

Upon discrimination, the presence of an agent in the proximate group may be transmitted back to the parent agent.

Upon discrimination, the presence and any combination of location and other identifying features may be transmitted from one or more of the neighbor agent to the parent agent.

Open discrimination, notification of the discrimination operation may be transmitted to one or more potential neighbor agents.

Open discrimination, notification of the discrimination operation any combination of location and other identifying features may be transmitted from the parent agent to one or more potential neighbor agents.

The transmitted information to/from agents may be representative in that the information may be stored on one or more network entities and transmitted to or from said network entity.

In one implementation, the discrimination operation is reinitiated periodically, as the parent agent location moves.

In another implementation, the discrimination operation is periodically reinitiated as the proximate zone following the moving path of the parameterized discrimination target.

In one implementation, the structure of the communication (restricted communication, open communication, structured communication, and free communication) is established at the outset by the parent agent, as part of the permissions in the query.

In one implementation, the structure of the communication (restricted communication, open communication, structured communication, and free communication) is established at the system level.

Combinations of the communication structuring process may be used, depending on the requirements of each particular implementation.

The layer structure may be initialized at a system level, or may be set up by the user during the initialization stage, or may be initially tailored by implementation at inception.

In one implementation, the layer structure may be altered using a list of layers available at the system level. In such an implementation, layers may be initialized (populated with relevant data by the user).

In one implementation, layers may be created and added by user agents.

It may be possible to send or receive layer structures, as in the form of an invite.

Layer structures may be added, as in layer allowances, using a trade metric.

Layers may be active or inactive and have permission preferences. For example, an agent may have initialized the auto-classification layers. "Republican", and "Sierra Club". Said agent may have the layer "Republican" active and the layer "Sierra Club" inactive. In such an implementation, for example, a parent agent query would reveal the agent's "Republican" classification, but would not reveal the agent's "Sierra Club" classification.

Different levels of information transmitted, or restricted based on agent layer user preferences. For example, that the agent has a "Sierra Club" layer at all may be transmitted, but not the related classification. As another example, the agent may appear invisible to other agents viewing by layer, and choosing to view the "Sierra Club".

In one implementation, permissions and preferences on layers may be determined at an agent level and controlled by the agent.

In another implementation, permissions and preferences are controlled at a system level.

Layer permissions and preferences may be established on a layer by layer basis.

Combinations of the approaches to layer permissions and usage are possible.

Several exemplary embodiments are now described to illustrate the potential utilities available within the present structure. The examples are in no way restrictive. They are constructions that demonstrate a variety of implementations.

In one exemplary implementation, the structure described herein is utilized to create a local communication group. A query is initiated to develop a proximate group of agents, amongst which communication may occur. Following the process shown in FIG. 14, for example, a proximate group of agents is established. The group, exemplified as shown in FIG. 7, then has an established communication link motivated by certain commonality, i.e., all at the same bar.

The discrimination operation is periodically performed to establish and refine the group of agents that are presently within the proximate region. In this manner, new agents within the locality are added to the proximate group and agents that have left the locality are removed from the proximate group.

In one exemplary implementation, potential member agents have their agent presence set up so that any proximity query results in notification of the member agent's classification status upon discrimination. The structure results in a form of a digital bumper sticker in which agents prominently display certain traits upon discrimination. For example, the agents may have the binary classification layer "Republican" with the computer machine set as "yes", reference FIG. 10.

During a query by any agent, the discrimination communication from the neighbor agent back to the parent agent, shown as 3046 in FIG. 14, contains trigger information to automatically notify the parent agent regarding the classification status of the neighbor agent.

The notification is independent of any direct communication, or subsequent classification queries. In essence, said classification information is transmitted at first contact, thus forcing the classification to prominence.

Such classification notification is the first part of any communication to the parent agent or to other member agents.

An extension of the implementation may incorporate notification for more than one classification layer.

An extension of the implementation may incorporate notification for more than one classification layer In one exemplary implementation, a parent agent initiates a selective search in which a refined proximate group is determined containing only those neighbor agents that have a particular layer and classification status. For example, the parent agent query for "Republican" agents will indicate the existence of proximate agents that have the layer "Republican" and an auto classification "yes".

Such an implementation may proceed as shown in FIG. 14, in which the selective layer status is an additional parameter utilized within the operations performed by network agent, 3040, to further discriminate the proximate group to satisfy the selective classification request, i.e., "Republican".

Such an implementation may also proceed by first performing a proximity query without the aforementioned layer selectivity. The base proximate group is then divided by a network agent into a selective discriminant subgroup, per the initial request, and a complementary proximate subgroup of agents that do not meet the selective search criterion of the initial search.

In another exemplary implantation a parent agent may initiate a selective search in which a refined proximate group is determined containing only those neighbor agents that do not have a particular layer and classification status.

The implementation may be extended to selective searches that are for combinations of attributes within the proximate subgroup.

In one exemplary implementation using the structure described herein, a parent agent initiates a query to develop a proximate subgroup from which classification information is gleaned. As one particular example, an attraction layer is utilized so that the parent agent may determine if there are agents in the proximate group which are likely to find the parent agent attractive. The situation is as depicted in FIG. 8

The process is proceeds as depicted in FIG. 14, in which a parent agent query discriminates neighbor agents. The neighbor agents in the proximate group might be, for example, all participating agents with 100 feet of a certain locale.

Figure 15:
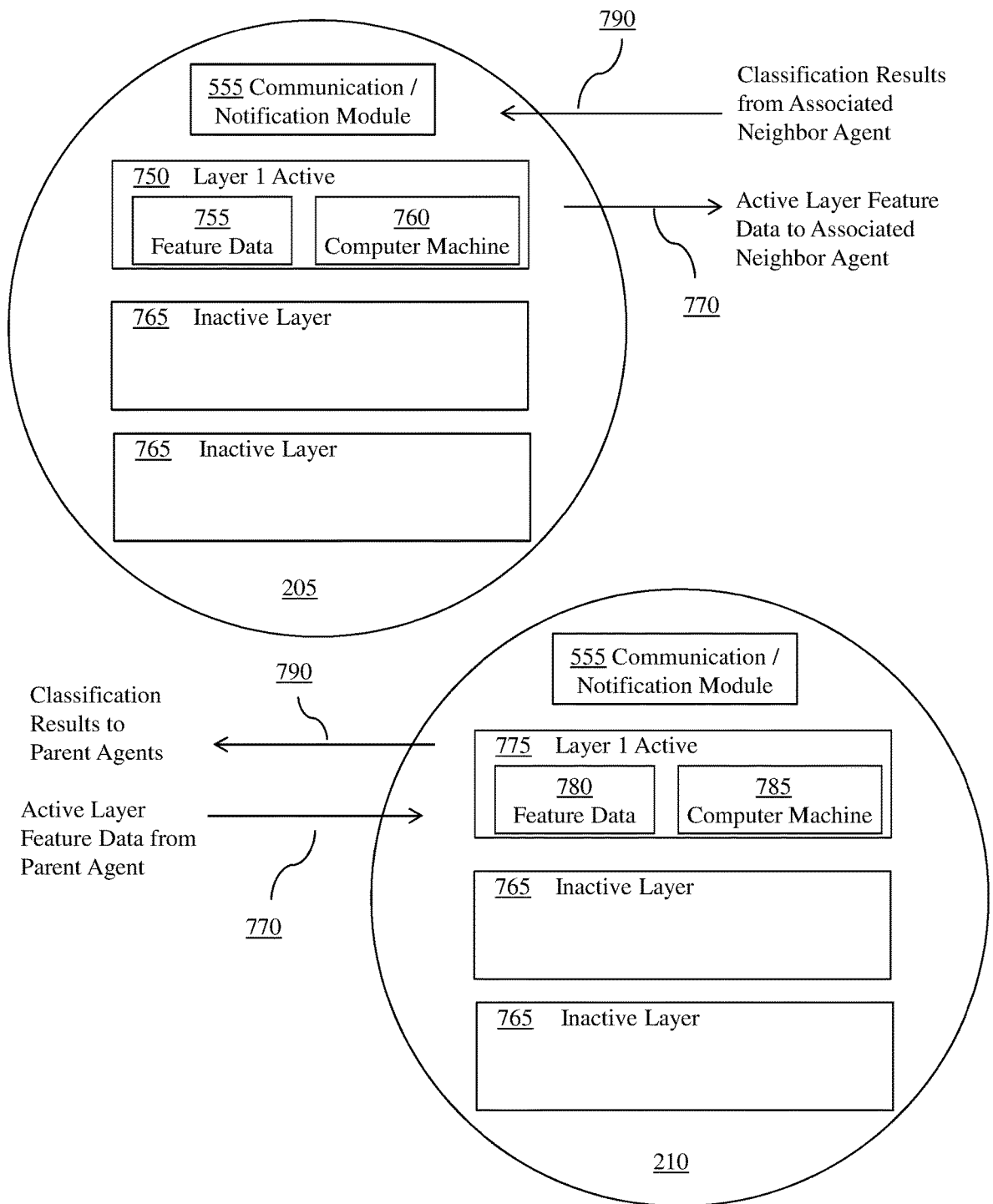
FIG. 15 shows an exemplary process in which parent agent feature data is classified by an associated neighbor agent.

Upon discrimination, the neighbor agents are classified as shown in FIG. 15, which depicts the classification interaction between the parent agent, 205, and an associated neighbor agent, 210. The parent agent is shown with one active layer, 750, and two inactive layers 765. The associated neighbor agent is shown with one active layer, 775, and two inactive layers, 765.

The parent agent feature data, 755, from the active layer, 750, is transmitted, 770, to the computer machine, 785, of the associated active layer, 775, of the associated neighbor agent, 210.

The computer machine, 785, on the associated neighbor agent active layer, 775 operates on the feature data to create a classification result which is transmitted, 790, back to the communication/notification interface, 555, of the parent agent. The feature data, 780, of the associated neighbor agent, may or may not be utilized in the classification process.

The classification may involve notification and communication through the associated agent communication/notification module, 555.

The process depicted in FIG. 15 is repeated for each of the associated neighbor agents in the proximate group.

Using the aforementioned example of attraction, the feature data of the parent agent may consist of demographic data, descriptive data, and statistical data that have been previously generated as part of the training process for the attraction metric.

The computer machine in the corresponding layer of each associated neighbor agent may consist of a computer construct generated to statistically capture the neighbor agent's attraction preferences. The construct has been previously generated as part of the training process for the attraction metric.

Additional attraction metric structures outside of the present example are available.

The classification process, using the computer machine, 785, is symbolically contained in the associated neighbor agent, 210. The classification may be performed in part or in whole on an external device.

Figure 16:
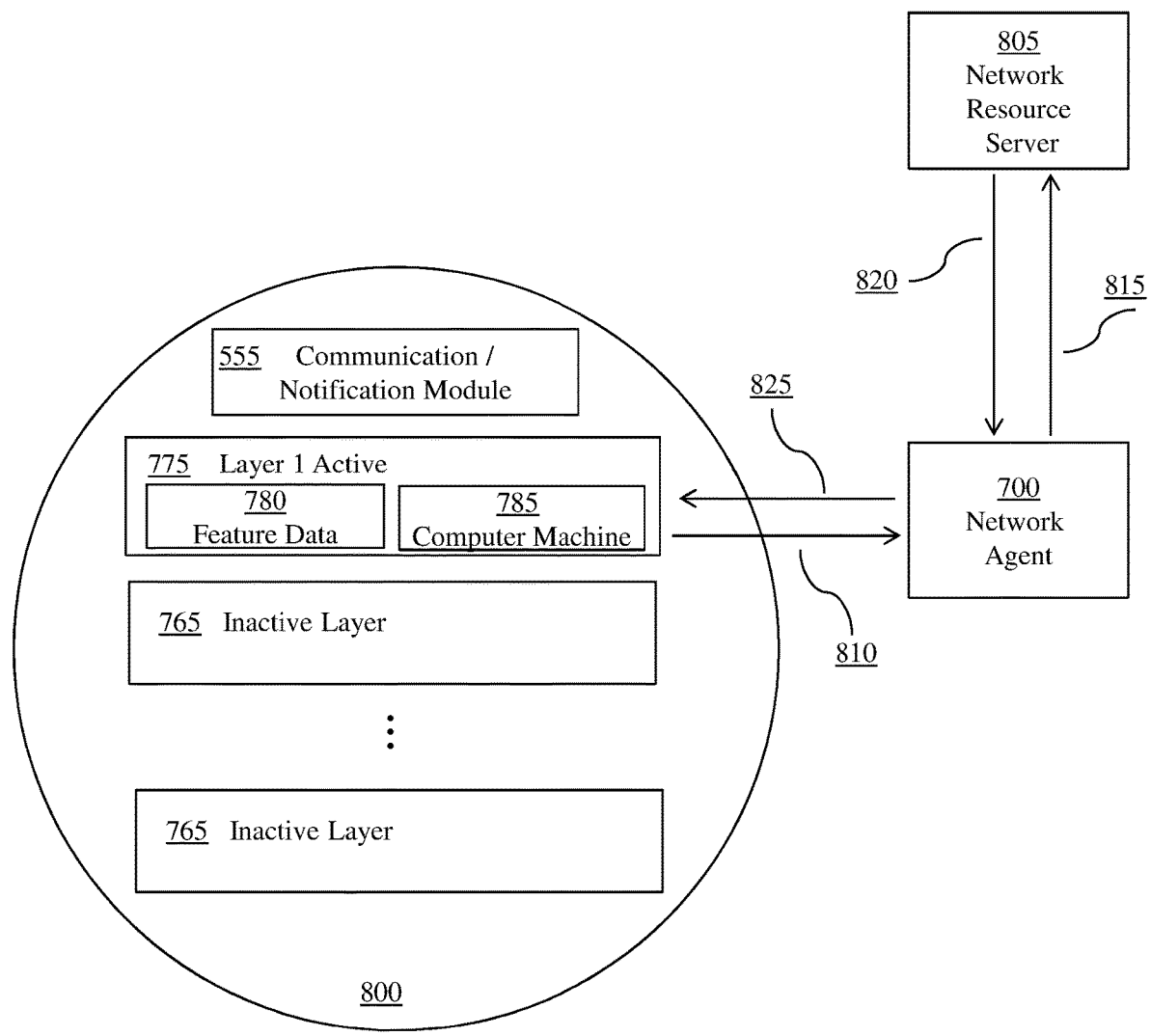
FIG. 16 shows the use of additional computer resources by the computer machine of an agent.

FIG. 16 depicts an agent, 800, with one active layer, 775, and two inactive layers, 765, utilizing external computing resource to process a classification operation for the active layer. Relevant data, i.e., feature data from the parent agent, is transmitted, 810, from the agent computer machine, 785, to a network agent, 700, that provides computational resource to perform the classification operation.

Some classification operations utilize externally provided data. Such externally available data may obtain through a query to an external source. The request is transmitted, 810, from the computer machine, 785, to the network agent, 700, and then transmitted, 815, to the network resource server, 805, The data from the external source is downloaded, 820, to the network agent, 700, for processing. The data and is then transmitted, 825, to the agent computer machine, 785. Additional cycles of the data search and retrieval may be performed as part of the classification operation.

External data and external computer processing may be performed in any combination by the network agent, 700, and network resource server, 805. Processing may also be performed in whole or in part in combination by the computer machine, 785, and the external resources.

Feature data, 780, from the agent active layer, may or may not be utilized in the classification process.

Notification to the parent agent may use any combination of the agent interaction types, anonymous, non-anonymous, one-way, and two-way.

In one exemplary implementation, the agent structure and classification mechanisms described herein are used to create a mechanism by which the political predisposition of manuscript authors are determined and used to tag (classify) the associated work. The process is different from other example implementations described herein in that the classification operation is not performed on an agent The classification uses the same process as shown in FIG. 16, where the name of the author of the article is supplied to the computer machine, 785, by the agent communication/notification interface, 555. The computer machine, 785, transmits, 810, the author name to a network agent, 700. A data query, 815 is made to network resource server, 805, where data mining techniques and natural language processing are used to assess the sentiment bias of the article author. The bias assessment results are transmitted back, 820, to the network agent, 800, and then back, 825, the computer machine, 785. The final result is transmitted to the notification interface, 555, where the article is tagged according to the author bias.

Classification results may be stored as multivariate classification structures, reference FIG. 12 to save on future computational overhead. The classification bias may be refreshed at any time, or may be performed every time.

Numerous data mining and classification operations are available using existing art, for example, natural language processing and sentiment analysis, or a statistical preference model following a market basket analysis.

The present structures and processes permit the implementation of peer to peer data exchange with dynamic demand.

In one exemplary embodiment, a peer to peer exchange for real time video with proximity driven dynamic demand.

Figure 17:
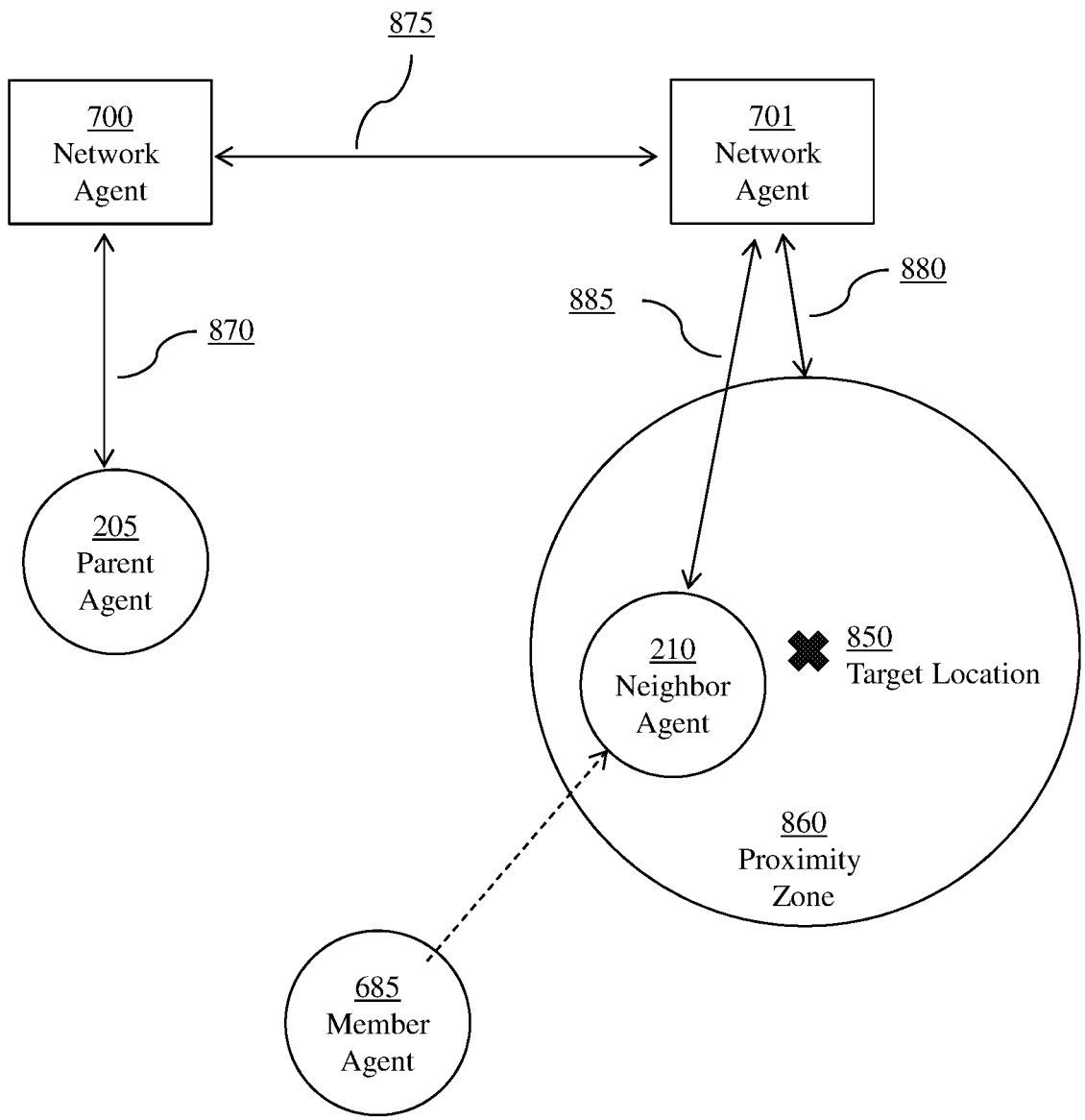
FIG. 17 shows the use of a proximity zone to request data from a target location.

The process is depicted in FIG. 17, which shows a parent agent, 205, which queries for video at the target location, 850. Information concerning the request is transmitted, 870, to an adjacent network agent, 700, and then to another network agent, 701, adjacent to the target location. A zone of proximity, 860, is established and scanned, 880, for candidate source agents therein.

Should no appropriate agent exist in the zone of proximity, the zone is monitored until a member agent which is a potential neighbor agent, 685, enters the zone and becomes neighbor agent, 210, which is a candidate source agent.

The parent agent request is enunciated to candidate source agents.

When a candidate source agent accepts the parent agent request, the video is uploaded, 885, to the network agent, 701, and transmitted via the agent network back to the parent agent.

The video thus sourced and transmitted may be archived as part of a library structure for future availability, or may be abandoned.

Data other than video may be exchanged in the same fashion. The intent is to provide dynamic demand for data of geographic and temporal importance. For example, data may be requested, in real time on location at breaking news story. As another example, real time video may be requested following a Rose Parade float.

Location categorized information about agents creates an environment from which a game may be created. The present exemplary implementation presumes that proximate group has been established at some location, i.e., a bar, and geographic position data of each proximate group member agent has been openly broadcast. Additionally, it is presumed that one or more agents have been classified, and the classification has been has been enunciated openly to the group anonymously.

The example configuration thus described is one in which the communication/notification module of each element displays the approximate location of each agent in the proximate group. The classification data, not being linked to any geographic data, is not attached to any particular one of the proximate agents.

The exemplary game challenge is for an agent to guess, based upon appearance, for instance, which of the proximate agents fit the available classification data. The guess can be directed to a particular agent using the positional aspect of the communication/notification interface.

The guess can be verified as correct or incorrect using the available system agent data and the result can be communicated to the agent making the guess.

Variations of the game are possible. As another example, a proximate agent's classification with regard to some layer, i.e., "Republican" is made. The guess is tested against system agent information, and the result is transmitted back to the agent making the guess.

Figure 18:
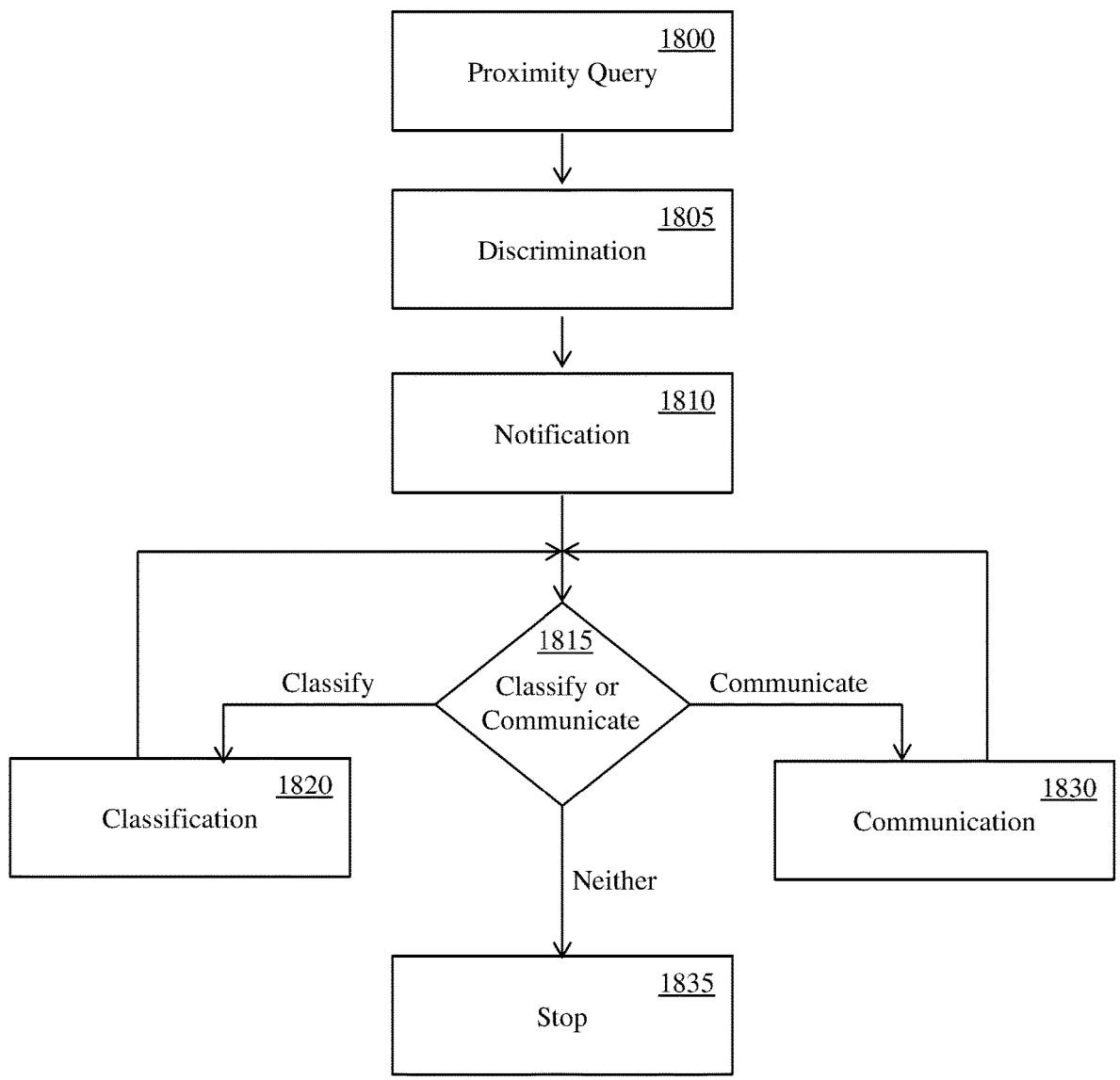
FIG. 18 is an exemplary block diagram of a process to detect and identify a proximate group of agents and establish communication, and classification amongst the agents.

Certain embodiments described herein may generally be described through the process diagram shown in FIG. 18.

The proximity query, 1800, is the operation by which the parent agent initiates the formation of a proximate group. The parent agent uses the communication/notification interface, 555, to select and enter proximity parameters, and communication and notification preferences. The classification option is specified and active layers for classification are selected. The proximity query parameters, communication/notification preferences, and classification options, are entered into the parent agent communication/notification interface to form a data input set that used as input in subsequent operations. The communication/notification interface is used to commence the discrimination operation, 1805.

When the discrimination option is commenced, 1805, the proximity query parameters, communication/notification preferences, and classification options that had been entered into the parent agent communication/notification interface are uploaded to a network agent. The network agent uses the proximity parameters as input for the discrimination operation. In certain implementations, other parts of the data entered during the proximity query, 1800, are also used as input to the discrimination operation, 1805. The network agent uses network resources to determine which member agents, 685, satisfy the proximity parameters selected in 800. The network identity and additional agent information relevant to the data input set entered in the proximity query, 1800, are obtained and utilized in the subsequent processes shown in FIG. 18. This completes the discrimination operation, 805.

The notification process, 1810, provides announcements and indications to the agents concerning various aspects of the discrimination process, 1805. The existences of each of the neighbor agents, 210, that are detected and discriminated during the discrimination process, 1805, are transmitted to the parent agent, 205, from the network agent, 700. Depending upon the communication/notification preferences, geographic information and/or additional neighbor agent, 210, data are also transmitted from the network agent, 700, to the parent agent. Depending upon the communication/notification preferences, the member agents, 685, that are queried as part of the discrimination process are notified of the discrimination process. Depending upon the communication/notification preferences, the neighbor agents, 210, that are established as part of the discrimination process are notified of their inclusion in the proximate group, and possibly geographic information and/or additional information about the parent agent. The notification process communicates the proximate group structure to the parent agent, 205, and neighbor agents, 210, and indicates the classification, 1820, and/or communication and data exchange, 1830, operations to follow.

The communication/classification decision point, 1815, shows the process branch, from which, the classification and communication operations begin. If neighbor agent classification has been requested as part of the query, 1800, then the parent agent, 205, communication/notification interface, 555, provides a prompt for the classification operation, 1820, to commence, and also for communication and data exchange amongst agents, 1830, to commence. Each of the operations, classification, 1820, and communication, 1830, commences upon execution by the parent agent, 205, at the decision point, 1815. The classification operation, 1820, and communication operation, 1830, may be performed in either order. Additional cycles of each may be performed, as shown on FIG. 18. If neither operation can be performed, the process stops, 1835. Neither operation can be performed when the proximate group is vacated, or expires, or is terminated by the parent agent or network agent.

Upon commencement of the classification operation, 1820, from the decision point, 1815, the classification operation, 1820, evaluates neighbor agents, 210, relative to feature data from parent agent, 755, or relative to other data independent of parent agent feature data, 755. Using the communication links established as part of the discrimination operation, 1805, the selected classification layer data are transmitted from the parent agent, 205, to the network agent, 700, and then to the neighbor agents, 210. The neighbor agents, 210 operate on the feature data, 755, and are classified accordingly. The classification results are transmitted to the network agent, 700, and then to the parent agent, 205, where the results are displayed on the communication/notification interface, 555. Depending upon the communication/notification preferences, the neighbor agents, 210, may or may not be notified of the classification process. Subsequent classifications may be initiated within the same process block, 1820, when the parent agent, 205, selects a different data layer for classification, and the classification process just described is repeated. Each classification operation is completed when the neighbor agents, 210, are classified, and the classification process results have been transmitted to the agents. From the classification process block, 1820, control returns to the decision point, 1815.

The communication process, 1830, provides notifications and data exchange between agents in the proximate group, 225. Using the communication links established as part of the discrimination operation, 1805, agents within the proximate group communicate and transmit data within the confines of the permissions and preferences established during the discrimination process, 1805. The communication and data exchange is performed (or initiated) using the agent communication/notification interface, 555. The communication process, 1830, is completed when the message, email, text, video, or data file to or from the agent has been transmitted and received, or the process has been interrupted by the parent agent, 205, neighbor agent, 210, or network agent, 700. From the communication block, 1830, control returns to the decision point, 1815.

Additional process structures are possible, describing implementation variations permitted by processes and structures described herein.

Figure 19A:
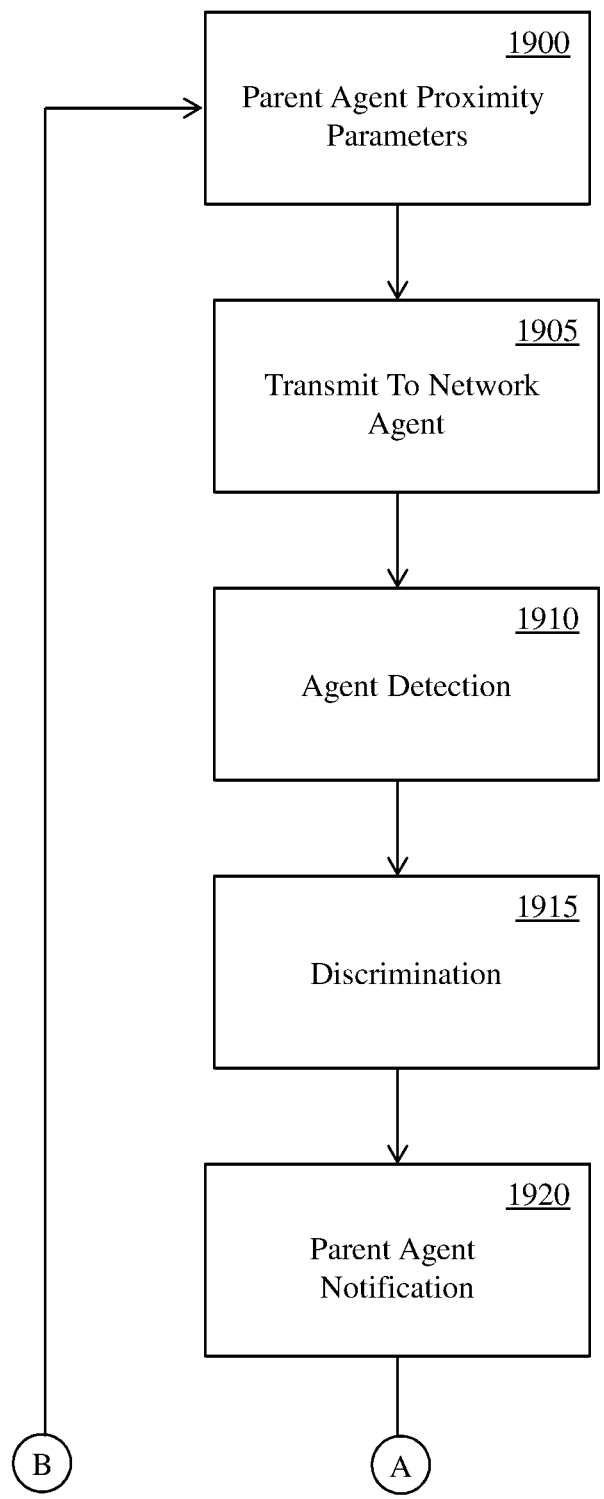
FIG. 19A is a detailed exemplary block diagram of the first portion of the processes depicted in FIG. 18.
Figure 19B:
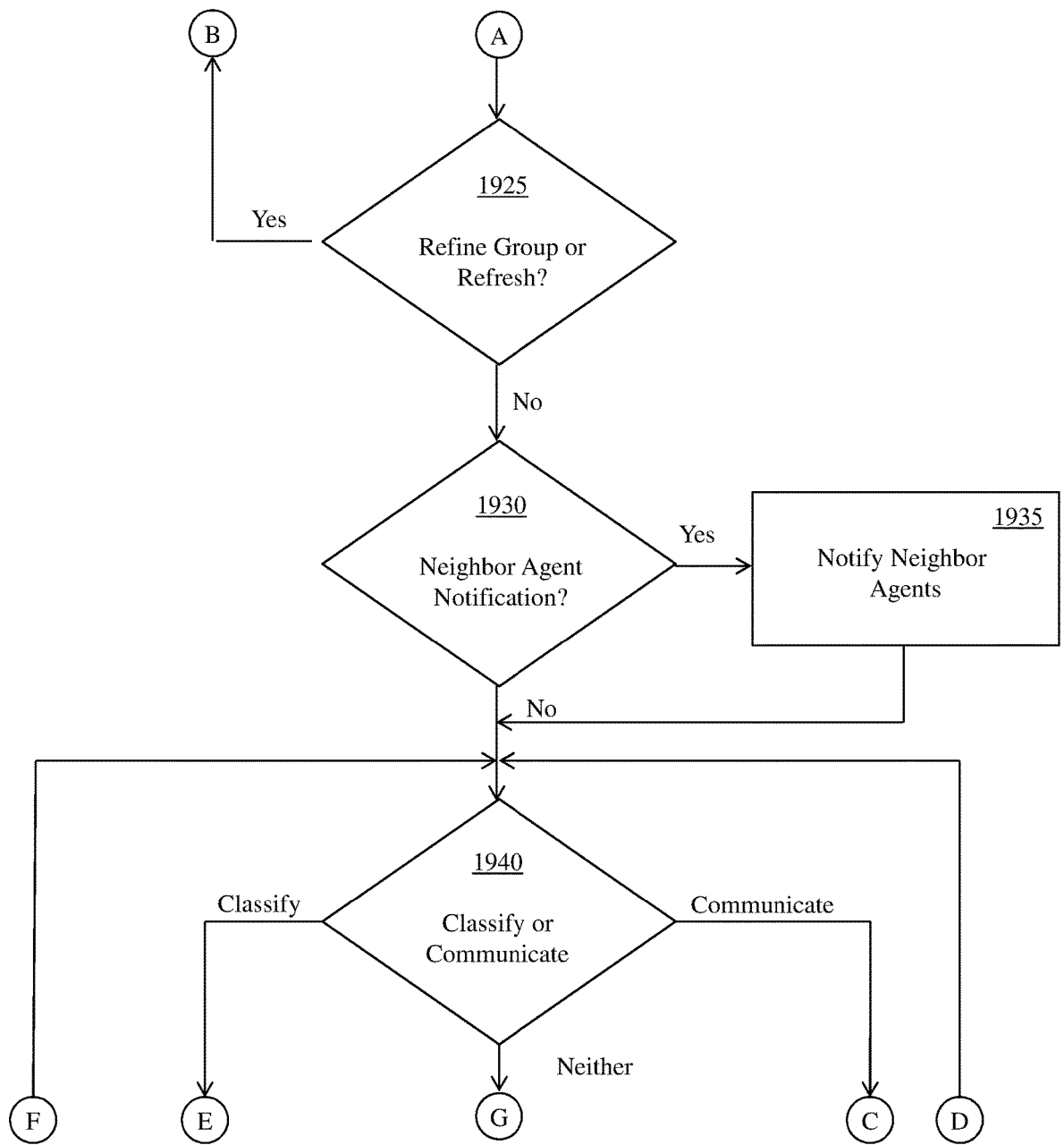
FIG. 19B is a detailed exemplary block diagram of the second portion of the processes depicted in FIG. 18.
Figure 19C:
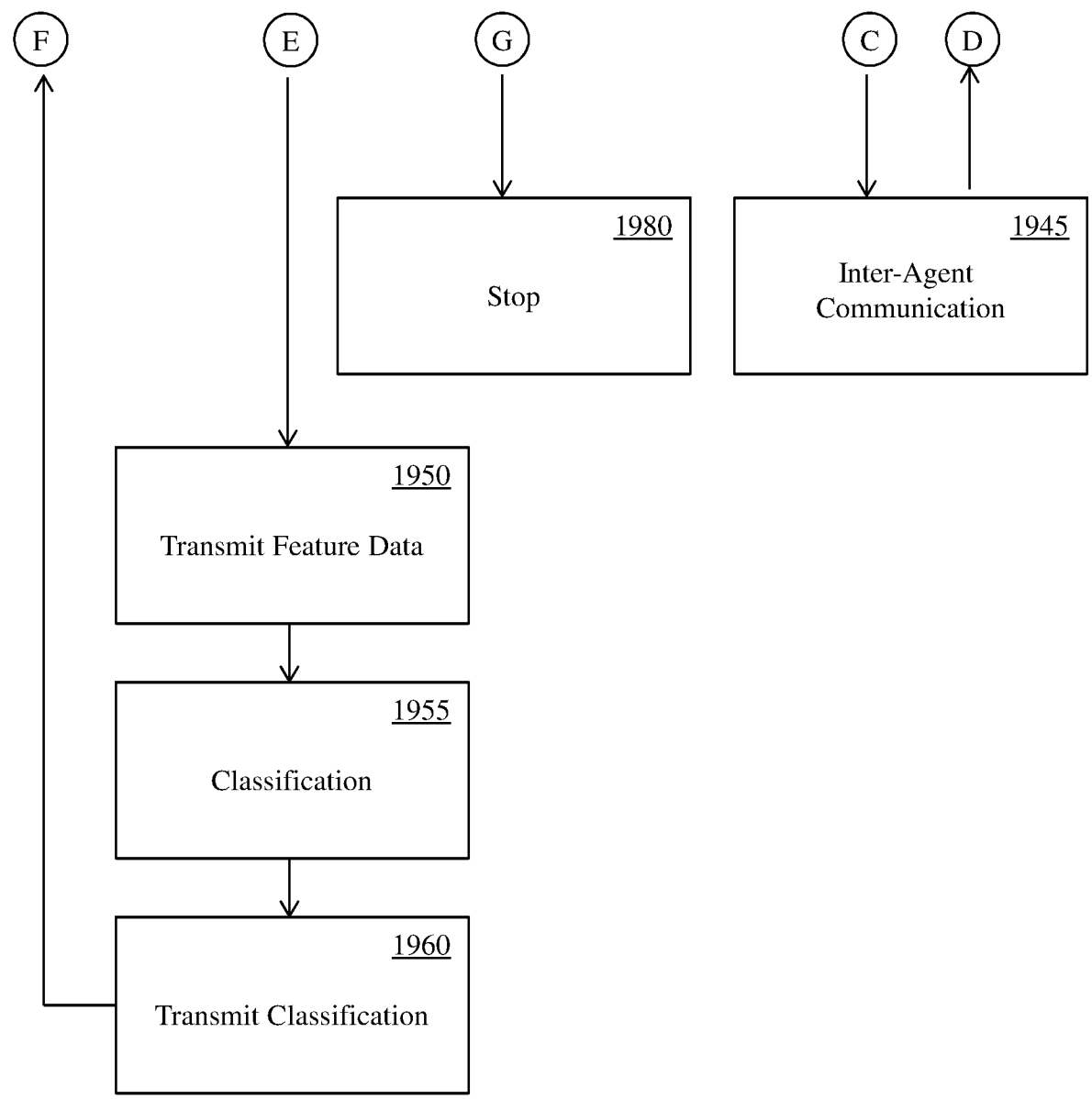
FIG. 19C is a detailed exemplary block diagram of the third portion of the processes depicted in FIG. 18.

The process depicted on FIG. 18 is shown in greater detail in FIGS. 19A, 19B, and 19C.

The parent agent proximity parameters, 1900, are the operation by which the parent agent initiates the formation of a proximate group. The parent agent uses the communication/notification interface to select and enter proximity parameters, and communication and notification preferences. The classification option is specified and active layers for classification are selected. Such parameters and such preferences may be stored as profile data and selected for subsequent queries.

Proximity parameters include geometric proximity parameters, and also additional parametric proximity parameters. Geometric proximity parameters include location data, i.e.; centroid and radius of the proximity zone. Additional proximity parameters include parametric data as permissible age, or sex. Such parameters are part of each agent's information profile and/or part of (or not) an agent's layer data structure Communication preferences indicate the level of notification and communication to be provided to and from agents during the discrimination and classification options, such as one-way non-anonymous communication in which the parent agent is to be notified of the existence of agents in the proximate region, and also of the location of each agent in the proximate region.

The classification option indicates whether or not any classification operation will be performed on the agents in the proximate region. The option to classify and to also establish a communication link is also provided.

Additional temporal and geographical specifications, such as the duration of the proximate grouping or multiple proximity region locations are also indicated.

The communication/notification interface is used to commence the query, upon which the proximity query data is uploaded to a network agent, 1905. The data entered to establish the proximate zone discrimination and other communication preferences and permissions, are transmitted to a network agent, 700, in preparation for the subsequent operations.

The network agent, 700, transmits the proximity parameters, as appropriate to other network agents, 700, to facilitate agent detection, 1910. Member agents, 685, that are within the geometric limits of the discrimination zone, 250, are detected and identified, 1910, by network agents, 700. The network identity and agent data for agents within the geometric limits of the proximity zone are used in the subsequent discrimination operation, 1915.

The discrimination operation is shown in 1915. Using the agent data obtained in 1910, the additional proximity parameters, beyond geometric proximity, are applied to each of the agents detected in 1910, to refine the group of agents. Agents that satisfy the geometric proximity parameters and that also satisfy the additional proximity parameters are categorized as neighbor agents, 210. Agents that do not satisfy all of the proximity parameters are categorized as excluded agents, 255. The discrimination operation, 1915, stops when all of the agents detected in 1910 have been adjudicated relative to all additional proximity parameters. The network identities, agent data, and categorization (neighbor agent, 210, or excluded agent, 255) are utilized as part of the input for the notification process, 1920.

The parent agent, 205, is notified regarding the process and results of the detection, 1910, and discrimination, 1915, operations. The existence of each of the neighbor agents, 210, that are detected, 1910, and discriminated, 1920, are transmitted to the parent agent, 205, from the network agent, 700. Depending upon the communication/notification preferences, geographic information and/or additional neighbor agent, 210, data are also transmitted from the network agent, 700, to the parent agent. The notifications are utilized as input for the subsequent parent agent, 205, decision point, 1925.

The notifications provided in 1920 are displayed on the communication/notification interface, 555, and reviewed by the parent agent, 205, from which a decision, 1925, to revise the proximity parameters is made. If the resultant proximate group of agents, 225, is not satisfactory, the proximity parameters may be revised, to restart the process, 1900. A prompt on the communication/notification interface is provided to either revise the proximate group, 225, or to accept the proximate group, 225. If the resultant proximate group of agents, 225, is satisfactory, the neighbor agent data and proximity query preferences are utilized as input for the neighbor agent notification decision point, 1930.

The decision to notify neighbor agents, or not, is shown in 1930. The neighbor agents, 210, are notified of their inclusion in the proximate group, 225, if the proximity query preferences input in 1900 indicate notification to neighbor agents. If the notification is indicated, a message is sent from the network agent, 700, to each of the neighbor agents notifying them of their inclusion into a proximate neighbor group. Depending upon the preferences set forth as part when establishing the discrimination parameters, geographical and/or other data about the parent agent, 205, is transmitted from the network agent, 700, to the neighbor agents, 210. Following notification, the process control flows to the decision point in which the parent chooses, 1940, to classify the neighbor agents, or communicate with the group of neighbor agents.

The communication/classification decision point, 1940, shows the process branch, from which, the classification and communication operations begin. If neighbor agent classification has been requested as part of the query parameters, 1900, then the parent agent, 205, communication/notification interface, 555, provides a prompt for the classification operations to commence, and also for communication and data exchange amongst agents, 1945, to commence. Each of the operations, classification, and communication commences upon execution by the parent agent, 205, at the decision point, 1940. The classification operations, and communication operations may be performed in either order. Additional cycles of each may be performed, as shown on FIG. 19. If neither operation can be performed, the process stops, 1980. Neither operation can be performed when the proximate group is vacated, or expires, or is terminated by the parent agent or network agent.

If classification is chosen at the decision point, 1940, the process control flows to process block 1950, where the parent agent, 205, information is transmitted, 1950, to each neighbor agent, 210. The feature data, 755, from the parent agent, 205 is transmitted to a network agent, 700, and then to the computer machine, 785, of each neighbor agent, 210. The feature data is used as input for the subsequent classification, 1955. The data transfer, 1950, is complete when the feature data has been transmitted and received by each of the neighbor agents.

Process control transfers to the classification operation, 1950, the computer machine, 785, of each neighbor agent, 210, operates on the parent agent, 205, feature data, 755, to obtain a classification result. The process is complete when each of the neighbor agent's classification is established. Process control then flows to process block 1960 where the classification results are communicated.

The classification result of each neighbor agent is transmitted to a network agent, 700, from when it is transmitted to the communication/notification interface, 555, of the parent agent, 205. Depending upon the preferences established by the initial proximity parameters used to initiate the formation of the proximate group, 1900, the notification may or may not be provided to neighbor agents that they have been classified. The classification results are viewed on the parent agent, 205, communication/notification interface, 555 Tithe classification transmission, 1960, is complete when all of the neighbor classification results have been transmitted to the parent agent, 205. The process then returns to the classify or communicate decision point, 1940.

If communication is chosen at the classify or communicate decision point, 1940, the process control flows to process block 1945, to commence inter-agent communication amongst agents in the proximate group, 225. The communication process, 1945, provides notifications and data exchange between agents in the proximate group, 225. Using the communication links established as part of the discrimination operation, 1915, agents within the proximate group, 225, communicate and transmit data within the confines of the permissions and preferences that are established during formation of the proximate group, 225. The communication and data exchange is performed (or initiated) using the agent communication/notification interface, 555. The communication process, 1945, is completed when the message, email, text, video, or data file to or from the agent has been transmitted and received, or the process has been interrupted by the parent agent, 205, neighbor agent, 210, or network agent, 700. From the communication block, 1945, control returns to the classify or communicate decision point, 1940.

Embodiments are not limited to processes described in FIGS. 18, 19A, 19B, and 19C.

According to exemplary embodiments of the present invention, three novel implementations of facial recognition and data management technology for social applications are presented; a facial rolodex, a reverse facial rolodex, and a set social networking applications. Each of the three implementations may be utilized independently for use on a computer or mobile device, for example.

The third implementation (social networking applications) requires a metric (or combination of metrics) according to certain embodiments. A particularly suitable metric may be derived from FRT. The third implementation is described independently from the choice of metric (to admit application with any suitable metrics). The novel metric derived from FRT is subsequently described.

The facial rolodex application is a facial data management application, that may or may not be facilitated using FRT. The concept is to have an application in which a name may be associated with a face in an organized fashion. By using a linked face-name database, the user may call up a picture of a name that is either typed, spoken using suitable voice recognition technology (VRT), or in the text of an existing document. The essence of this application is to simply place a face with a name. The following features or design elements are presented:

Facial look-up. The application retrieves an associated facial image by typing a name, or by speaking a name, or by scrolling through a list or document to find a name.

Tagged text in a document. The application presents a face image corresponding to a name in a text. The image is either being permanent or transient, and may be toggled on or off. The face image retrieval may either be passive (as when the cursor or selector icon is floated above the text) or active (as when the name text is highlighted and a keystroke or button is used to activate the facial image retrieval). The application may be embedded upon existing text, or may be applied over text as it is typed (as when a face is called up simply by typing the name, as the name is typed).

Text tagging. The application is used to create a real time pop-up of an associated facial image for text messages or emails received.

Conversation tagging. The application is used to retrieve an associated facial image (and biographical information) for the names of people that are associated to snips of conversation. This application may be used for ambient conversations, or for telephone or radio conversations. It associates a face with the speaker. For example, during conference calls, the application uses VRT to identify the person speaking, and retrieves the associated facial image (if the speaker is in the database library).

Conversation Capture. The application identifies names that were spoken during conversations and retrieve associated images for the spoken names. The kernel of the application functions just as does conversation tagging, however the feature that triggers the data retrieval would be a spoken name.

Organizational Structure. The name-face database library may be augmented by the user in the same fashion that contact information is added and edited. The libraries may be shared or merged and may be organized with associations, i.e.; a name-picture for your neighbor may have tree-like connection to the neighbor's wife, etc. The organizational structure may be presented in different fashions, as in a tree diagram with connections (relationships) and nodes (entries).

Social Networking. The facial rolodex application and organizational structure may be implemented along with social media to allow a social media presence to be linked to a face-name data pairing. The application may be tasked with data mining the present webpage to create new, and develop existing, name-face-data data association's database.

Database building. Any element of the associations, name-face-data, for an entry in the database may be added to an existing entry, or entered to create a new database entry. The database entries may be modified, completed, augmented or edited using additional information that becomes available through the processes to which the application is directed.

The reverse facial rolodex application is a facial data management tool that uses FRT to identify faces and retrieve social contact and other information attached to a face in the name-face library. It allows the user to user to identify a facial image and allow a user to also retrieve data associated to a person. The essence is to simply place a name to a face. The following features or design elements are presented.

Direct image sensing. The application may be utilized to access archival information linked to a facial image in the database that is entered with a cell phone. The cell phone may be used to scan a face or a crowd and thus retrieve information about any faces from the images that are in the facial image database.

Email image input. The application may be used to recall linked information attached to a facial image in a picture embedded in or attached to an email.

Website image capture. The application may be used to retrieve linked information associated with any facial image from the database that is contained in a photograph that is attached to, linked to, or embedded in a webpage. The application may be tasked with drilling down and seeking facial images at some level of association with the present webpage.

Document image capture. The application may be used to capture images embedded, linked, or tagged to a document and retrieve associated information for any image in the database.

Video image capture. The application may be used to retrieve linked information associated with any facial image from the database that is contained in a video. Any of the resources, from which an image is made available to the application may also be used to convey or provide video to the application.

Social Networking. The reverse facial rolodex application and organizational structure may be implemented along with social media to allow a social media presence to be linked to a name-face data pairing. The application may be tasked with data mining the present webpage to develop and populate associated data linked to an image in the database, and to develop new name-face-data associations to add to the database.

Database building. Any element of the associations, name-face-data, for an entry in the database may be added to an existing entry, or entered to create a new database entry. The database entries may be modified, completed, augmented or edited using additional information that becomes available through the processes to which the application is directed.

Methods have been developed for facial recognition using Eigen space analysis. The Eigen face approach, casts the identification and classification of facial images as a mathematical problem, utilizing vector space analysis, as used in numerous fields of science, math and engineering.

Most young people (in particular) are concerned with their attractiveness to other people. When any individual describes attractiveness (how attractive someone is), there is some continuum; extremely attractive, very attractive, somewhat attractive, somewhat unattractive, etc. Thus, a metric of attraction can be described, and the metric may be used in a social application.

Since the Eigen face concept codifies a facial image as an element of a large dimensional vector space, which is axiomatically also a metric space (with a Euclidean metric), it provides a mathematical structure by which attractiveness may quantified. This notion permits the development of the broader idea of a social application that addresses the issue of attractiveness according to certain embodiments.

The following discussion describes applications according to certain embodiments, which ultimately may be used with a variety of metrics, or combinations of metrics. Following the discussion of several applications, a specific metric obtained by using facial recognition Eigen space is described in detail according to certain embodiments. An additional suitable metric using neural networks is also described, according to other embodiments.

The application is addresses the issue of attractiveness, and the perception, by others, of one's attractiveness. A person may determine how attractive he or she is to another individual without direct input or interaction with that individual. Additionally, an individual may get some measure of how attractive he or she would find another person without visually making that assessment. The ideas are extended according to certain embodiments to situations that arise from the information that becomes available with a suitable attractiveness metric.

If there exists a suitable metric of attractiveness, and if information or parameters necessary to establish the metric which describes their attraction to others is available, then certain measurements may be performed. More precisely, different parties could make the measurement of attraction. For example:

An individual could measure how attractive any other person would be (A measures how attractive B is to A).

A person could measure how attractive an individual would find that person (B measures how attractive B is to A).

A third party measures attraction (C measures how attractive B is to A and vice versa).

Provided that the individual's metric can be parameterized in some sufficiently convenient manner, then the metric may be reconstructed and thus applied as a test of any person's attractiveness. Thus, a virtual device is created that determines how attractive person B is to person A.

The application of the metric concept according to certain embodiments may be utilized for any social application website such as Facebook or Instagram. The utilization may take several forms, as listed below in certain exemplary embodiments:

Image Classification—(A measures) The user may actively or automatically classify incoming images (or linked persons) by attractiveness to the user. The resulting classification may simply be private, as a convenience to the user. The resulting classification may also be made public (open to all), or semi-public (shared with chosen users).

Reverse Image Classification—(B measures) The user may measure how attractive he or she is to the person depicted in incoming images (or linked persons). The resulting classification may be private (to B) or shared with the owner of the image (or linked person).

The application of the metric concept may be utilized as a search engine, or to modify a search engine or search results. The utilization may be used in a dating website search, a social networking search, or on a generic search engine search.

Attraction Search—(A measures) A search may be made, using the metric, for people that are attractive to A.

Reverse Attraction Search—(B measures) A search may be made, using the metric, for people that would find An attractive.

Search Modification—A search may be made using traditional methods (keywords, AI, for instance) and modified using the metric. For example, search for brunettes, named Elizabeth, that find a certain person attractive.

The application of the metric concept could be used by a third party (C measures) in fixed or mobile applications—(C measures). For example, person A may test to see if a person that person A meets at work would be attractive to person A's neighbor. As a different example, person A may test to see if a person A meets at work would find person A's neighbor attractive.

The metric may be used as a stand-alone website or mobile application, in which users may test themselves by other users, and test other users. They may also search users for attractive or attracted users. The stand alone may serve as a dating website, or simply as an interesting waypoint, by which, members could judge their attractiveness.

The application of the metric concept may be utilized for a mobile application that utilizes position information to augment the measurement available from the metric. The essence of the application is that someone may see that there are people that find that person attractive in the same locality (at a party, for instance).

Blind Annunciation—The metric parameters of an individual's attraction metric are broadcast locally according to certain embodiments. The metric is then used by other users in the same locality to test their own appearance. Thus, a person can see if there are other individuals in the location that would find that person attractive. No specific information about either person or either person's precise location is exchanged, according to certain embodiments.

Open Annunciation—The metric parameters of an individual's attraction metric are broadcast locally, according to certain embodiments. The metric may then use by other users in the same locality to test their own appearance. Thus, a person can see if there are other individuals in the location that would find that person attractive. However, in contrast to the blind annunciation described above, some or all available information about one person, or the other (including, possibly, precise location) is transferred, according to certain embodiments.

The application is essentially the same as the mobile application in certain embodiments, except the information is integrated into a network so that a user can view information about the people at a remote location, such as at a restaurant.

The application according to certain embodiments provides an objective test for attractiveness that is based upon a metric derived from a group of people. The group metric may then be used to test the attractiveness of an individual to a group. This utilization may thus be used to see if a particular individual is attractive to a group. This implementation may be used for hiring and selection in professions where appearance is important.

By nature, the utilizations described herein present themselves to gathering all manner of statistics regarding attractiveness. The statistics may be used to determine if a person is attractive to some particular demographic. It may also be used to extract trends.

One particular formulation of FRT, Eigen faces, is cast in a mathematical formulation that permits allows the development of an attractiveness metric that is particularly well suited for use in the social networking application described above. The Eigen face concept treats facial recognition as a mathematical problem (eigen-analysis) in large scale, finite-dimensional vector space.

In certain embodiments, a photograph of a face is depicted as a rectangular array of intensity values. It can thus be represented as a vector of intensity values. For example, a 256×256 image can be expressed as a vector in 65,536-dimensional space. Prior artists have noted that a group of such images can be sufficiently well represented when the images are projected onto an appropriate subspace of the original 65,536-dimensional space. The appropriate subspace is determined by performing an eigen-analysis on the covariance matrix of the group of images. Further, images that are not members of the sample group can be classified as facial images, or as images of something else by determining the proximity of the tested image to the subspace comprised of the sample images. The entire formulation is developed as a facial recognition technology that is effective and robust, that requires relatively low computer storage and relatively low computational effort.

These formulations demonstrate the practical use of the mathematical structure (vector space) that is available when a facial image is described as a finite dimensional vector. The present development according to certain embodiments (attractiveness metric) capitalizes on those very same mathematical elements; finite dimensional vector space, subspace, eigen-analysis, norm, and metric. For sake of description, the following discussion is presented in the context of 256×256 facial image representation. Note that the ideas may be directly extended to other image sizes, depending on the particular requirements of each implementation.

A finite dimensional real vector space has a Euclidean norm, and by simple extension, has a metric (norm of the difference of two vectors). This is a familiar metric, however it must be noted that it is not the only metric that can be constructed which will satisfy the definitional property of a metric. Utilizing the subspace of images screened for attractiveness and/or the subspace of images screened for un-attractiveness presents an opportunity to utilize any such metrics available within the vector space construction, plus any combination of metrics and other features (brunette, Catholic, etc.).

A metric for attractiveness may be formed for an individual by presenting the individual with a test set of 256×256 facial images which the individual categorizes as attractive, or not attractive. The attractive images form a subspace in 256×256 face space. The attraction metric is created by utilizing the vector space metric that is available as part of the mathematical structure (vector space) utilized. The distance of the test image vector from the attractive image subspace is the attraction metric; a very close image is deemed attractive, and a very distant image is deemed not attractive.

A metric for attractiveness may be formed for an individual by presenting the individual with a test set of 256×256 facial images which the individual categorizes as attractive, or not attractive. The non-attractive images form a subspace in 256×256 face space. The attraction metric is created by utilizing the vector space metric that is available as part of the mathematical structure (vector space) utilized. The distance of the test image vector from the non-attractive image subspace is the attraction metric; a very close image is deemed attractive, and a very distant image is deemed not attractive.

A metric for attractiveness may be formed for an individual by presenting the individual with a test set of 256×256 facial images which the individual categorizes as attractive, or not attractive. The attractive images form a subspace in 256×256 face space and the images that are non-attractive form the complementary subspace in 256×256 face space. The attraction metric is created by utilizing the vector space metric that is available as part of the mathematical structure (vector space) utilized. The distance of the test image vector from the attractive image subspace and the distance of the of the test image vector from the non-attractive image subspace provide two numbers used to gauge the attractiveness of the test image.

A metric for attractiveness may be formed for an individual by presenting the individual with a test set of 256×256 facial images to which the individual assigns attraction values (1 to 10, for example). This scaling is simply used as a discrimination parameter for the division into attractive, and not-attractive subspaces used in the metrics described above.

A metric for attractiveness may be formed for an individual by presenting the individual with a test set of 256×256 facial images to which the individual assigns attraction values (1 to 10, for example). The test images form a subspace with an associated scaling (in essence an additional dimension—think of the three dimensional plot in which the test vectors are in the X-Y plane, and the scaling is the associated Z-value). The test image may be projected onto the sample space (closer to the attractive images, or closer to the un-attractive images) to see what the associated scale (attractiveness value) is for the projected test image.

Neural networks are a structural form of artificial intelligence that are commonly applied to pattern recognition problems, such as facial recognition technology. Neural networks are a kind of black box approach in which a network of simple behavioral cells (perceptron's, for instance) are trained so that the response of the system adheres sufficiently well to a desired algorithm.

In the same fashion that a neural network may be utilized to identify an image as a face, and select a particular face from a training set, a neural network may be trained to identify a face as attractive or non-attractive according to an appropriate training set of images. A neural network may therefore be used as attractiveness metric. The network, a back propagation, feed forward network, for example, would provide discrete output signals such as attractive and non-attractive (two output cells), or attractive, non-attractive, neutrally attractive (three output cells), etc.

In this manner, a neural network may be trained to create attractiveness metric for use in any of the aforementioned components of the attractiveness application.

There may be other combinations not explicitly presented here. Therefore it is understood that the invention is not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub combination of the elements from the different species and/or embodiments disclosed herein.

I claim:

1. A method to establish a group of autonomous agents based upon location, for establishing communication and notification of classifications amongst said agents comprising the steps of:
    defining a set of geometric parameters which describe a domain;
    detecting and identifying a group of two or more agents as members of said domain and establishing a communication link between said agents, wherein each such agent is associated with a respective user computational device;
    notifying said agents of said detected and identified group;
    transmitting agent feature data associated with one or more of said agents in said group to one or more of other said agents in said group, and classifying one or more agents in said group depending on said transmitted agent feature data, wherein said agent feature data comprises attractiveness data associated with each of said one or more of said agents in said group, and wherein a metric for said attractiveness data may be formed for an individual by presenting said individual with a test set of facial images which the individual categorizes as attractive or not attractive; and
    communicating said classifications to one or more of said agents in said group, wherein said step of notifying said agents of said detected and identified group comprises a notification of the presence of said one or more of said agents within said domain.

* * * * *